US005555494A

United States Patent [19]
Morris

[11] Patent Number: 5,555,494
[45] Date of Patent: Sep. 10, 1996

[54] MAGNETICALLY INTEGRATED FULL WAVE DC TO DC CONVERTER

[76] Inventor: George Q. Morris, 3563 Quarzo Cir., Thousand Oaks, Calif. 91362

[21] Appl. No.: 121,271

[22] Filed: Sep. 13, 1993

[51] Int. Cl.$^6$ .................................................. H02M 3/335
[52] U.S. Cl. ............................................. 363/17; 363/132
[58] Field of Search .................................. 363/17, 98, 132

[56] References Cited

U.S. PATENT DOCUMENTS

| 4,825,348 | 4/1989 | Steigerwald et al. | 363/17 |
| 4,858,093 | 8/1989 | Sturgeon | 363/20 |
| 4,864,479 | 9/1989 | Steigerwald et al. | 363/17 |
| 5,132,888 | 7/1992 | Lo et al. | 363/17 |

OTHER PUBLICATIONS

Severns & Bloom; "Modern DC/DC Switchmode Power Converter Circuits"; Van Nostrand Reinhold Company, Dec. 1985.

Primary Examiner—Jeffrey L. Sterrett

[57] ABSTRACT

A full wave DC to DC converter that is magnetically integrated so that the function of the output filter inductor is magnetically included in the transformer assembly. Two essentially symmetrical transformers have their primary windings connected in series and are driven by a full wave switched primary circuit such as a full bridge. The transformer secondaries are polarized so that their rectifying diodes conduct on opposite phases, so only one transformer secondary conducts for each half cycle. The conducting secondary winding conducts for each half cycle. The conducting secondary winding conducts both forward current reflected from the primary and flyback current from collapsing core flux. The transformer having the non-conducting secondary stores energy as magnetic flux. On the other half-cycle, the transformers reverse roles. Because stored transformer flux energy is released to the load through the secondary windings, continuous current is maintained and no separate output smoothing inductor is required.

11 Claims, 15 Drawing Sheets

FIG. 1 (PRIOR ART - STURGEON)

MAGNETICALLY INTEGRATED FULL WAVE DC TO DC CONVERTER

FIELD OF THE INVENTION

This invention relates to DC to DC electrical power converters, and more particularly to high frequency switching mode converters which employ transformers and have continuous output current.

BACKGROUND OF THE INVENTION

Contemporary switching mode DC to DC converters are expected to possess the virtues of high power density and high efficiency, yet at a minimum cost and with high reliability. The magnetic elements of a converter are usually the largest and most costly components, and significantly impact efficiency and reliability. Advances in the art of DC to DC power conversion often focus on techniques for reducing cost, size and complexity of the magnetic elements of converters. Of particular interest have been recent advances in the technique of integrated magnetics. Integrated magnetics allows separate transformer and inductor functions to be integrated onto a common magnetic component, thus simplifying the converter and reducing the overall number of magnetic components for increased reliability.

The usual DC to DC converter accepts energy from a low impedance voltage source and provides energy to a capacitively filtered output which functions as a voltage sink. Since the switching conversion process typically is not amenable to directly supplying a voltage sink from a voltage source, a current sink/source is imposed in the energy conversion path. This is nearly always an inductive element. For instance, the averaging inductor performs this function in the familiar Buck converter, allowing a pulse width modulated switching circuit to provide continuous regulated current flow from a low impedance voltage source input to a capacitively filtered output.

Transformers are also prominent components in DC to DC converters. Although the transformerless non-isolated Buck converter provides excellent performance for certain DC to DC converter uses, most applications are better served by a fully isolated converter. Transformers provide an ideal means for isolation, as well as the voltage level conversion so often required. For instance, the familiar Buck-derived single ended forward converter provides an isolated means for delivering continuous current from an input voltage source to a capacitively filtered output. To accomplish this, however, it requires two magnetic components: an averaging inductor, and an isolation transformer. The presence of two magnetic components burdens the converter with respect to complexity and efficiency, as compared to its non-isolated Buck counterpart, since there are now transformer windings in series with inductor windings. Furthermore, when an isolation transformer is used (such as for the single ended forward converter), transformer magnetizing flux causes transformer magnetizing current to flow in addition to the load current in the primary circuit, which increases winding and switch RMS losses due to increased RMS current flow, and can dramatically increase overall converter losses unless the energy associated with the magnetizing current can be recirculated losslessly. Contending with the magnetizing current can significantly increase cost and complexity of the converter.

Isolated DC to DC conversion with only a single magnetic element is easily accomplished by use of the familiar flyback converter. In a flyback converter, the "transformer" is, in actuality, a coupled inductor where separate windings having a turns ratio provide isolation and DC level conversion. This provides for a simpler converter than the single ended forward, since the number of output windings and cores has not increased over the non-isolated Buck converter. Moreover, the magnetizing energy in the flyback converter is actually the output energy. It is virtually all discharged through the output winding, thus avoiding the problem of the Buck derived converters where transformer magnetizing energy must be recirculated or dissipated. Unfortunately, the flyback has the drawback of discontinuous output current, and is thus only well suited for lower power applications due to output filtering requirements.

Although both the flyback and single ended forward converters effectively employ magnetic elements to provide isolated DC to DC conversion, both topologies have deficiencies in many of the other circuit parameters necessary for optimizing overall converter function. For instance, both are single ended, that is, both only operate as half-wave converters. It is well known in the art that double ended, or full wave, converters make better use of the magnetic components since the transformer is energized in both directions and energy is transferred from the primary during both switching half cycles. This improves magnetics utilization, and simplifies filtering requirements at both the input an output of the converter. A further advantage of full wave operation implemented with the bridge configurations is that it is easy to clamp the primary current associated with leakage inductance to the primary voltage source via anti-parallel diodes across the switching transistors. Practical single ended designs often have the disadvantage of requiring the energy associated with the leakage inductance to be dissipated as losses in a snubber circuit. Additionally, single ended designs often have limitations for high frequency operation which adversely affect control of dV/dT (snubbing) and core reset. Full wave Buck derived converters, such as the half bridge or full bridge, overcome the high frequency operation disadvantages of half wave designs. In addition, full bridge type full wave designs can enjoy the distinct advantages of zero voltage switching techniques, such as the one taught in U.S. Pat. No. 4,864,479 to Steigerwald et al. The flyback converter, however, inherently cannot be implemented as a full wave circuit, since a half cycle of having the primary open is required for the discharging flux to provide current to the load.

In response to the challenge of making improvements in magnetics utilization, many techniques have been developed for integrating transformer and inductor magnetic functions into common magnetics assemblies. This has become known in the art of DC to DC power conversion as "integrated magnetics". Employing techniques of integrated magnetics, it is possible to combine multiple magnetic functions into a single magnetic assembly, thus simplifying the construction of conventional topologies which inherently require multiple magnetic functions for their operation. In particular, there are many ways to integrate the magnetic functions of the well-known transformer isolated derivatives of the Buck converter. Information on the design of converters employing integrated magnetics can be found in a text by Rudolf P. Severns and Gordon E. Bloom, titled "Modern DC-To-DC Switchmode power Converter Circuits" (Van Nostrand Reinhold Company, 1985).

Although implementing a conventional converter utilizing an integrated magnetic assembly can result in some improvements, further improvements have been made through the development of novel topologies which optimally utilize integrated magnetic structures. FIG. 1 illustrates such a prior art integrated magnetics converter, exemplified in U.S. Pat. No. 4,858,093 to Sturgeon. In the Sturgeon converter, a primary winding operates to induce flux in an integrated magnetic assembly so that two secondary windings provide current to a load. When the switching element energizes the primary, some current flows to the load by direct transformer coupling to the first secondary winding, while simultaneously some energy is stored in the core as an increasing flux level. When the switch terminates current flow in the primary, flux flyback action initiates current flow in the other secondary while simultaneously sustaining current flow in the first secondary. This allows energy to be effectively stored in the core while permitting continuous output current flow. Also, since the magnetizing flux in the transformer assembly provides flyback energy to sustain continuous output current flow, it does not have to be recirculated as for Buck derived isolated converters. However, the converter according to the Sturgeon patent still requires output current to flow in multiple windings in series, as opposed to just the transformer secondary winding, so there is some extra conduction loss over that which would occur if there were only one winding at a time in the output current conduction path. Moreover, since continuous current flow is sustained by flyback action, the Sturgeon converter is required to be of half-wave design. In the Sturgeon converter as well as conventional designs, half-wave operation increases stress on the switching element for a given power level as opposed to a full wave design, and precludes enjoying the further magnetics utilization and high frequency operating advantages of double ended or full wave designs.

SUMMARY OF THE INVENTION

The present invention optimizes the magnetic elements of a DC to DC converter by a novel design which is magnetically integrated so that the function of the output filter inductor is magnetically included in the transformer assembly. A primary circuit consists of the series connection of the primaries of two symmetrical transformers. A DC input voltage is alternately switched across this series connection in a full wave manner. During one half-cycle, the secondary winding of one transformer simultaneously conducts reflected primary current and current from the collapse of the magnetic field in its core, while the secondary of the other transformer is open so that its core flux increases to store energy. During the other half-cycle, the transformers reverse roles. During times when the primary switches are not conducting, both transformers release energy to the secondary windings, thus maintaining continuous current flow to the load. Because energy stored as flux in both transformers is released to the output through the transformer secondary windings, no separate output filter inductor is required. Elimination of a separate filter inductor results in improved converter density, reduced expense and complexity, and lower winding and core loss.

OBJECTS AND ADVANTAGES

In view of the drawbacks of prior art converters in optimizing magnetic component utilization, the present invention sets forth a novel topology which operates advantageously with a magnetically integrated structure combining transformer and inductor functions.

Accordingly, it is one object of the present invention to provide a converter capable of delivering continuous current to the output via transformer secondary windings, wherein part of the current flowing in a secondary winding is induced from the primary winding while simultaneously the other part of the current flowing is induced by a collapsing flux field in the core.

Another important object is to provide a full wave converter delivering continuous output current from two secondary transformer windings, and where only the transformer secondary windings and no supplementary series inductor windings are required to provide this continuous output current.

Another object is to provide a magnetically integrated converter which employs full wave primary switching to energize the magnetic circuit in both directions, allowing reductions in magnetic component size, and affording the capability of employing other advantageous circuit techniques associated with full wave designs.

A still further object is to provide a converter wherein the operating flux level of the core assembly is independently controllable for each half-cycle of operation, thereby facilitating the implementation of conventional true peak-sensing primary side current mode control in half bridge configurations.

Yet another object is to provide a converter wherein direct, rather than transformer reflected, inductance is present in series with the transformer primary winding in order to give the converter current-fed features to afford protection against output fault conditions and transformer saturation.

An important object is to provide a converter wherein multiple outputs can be obtained by multiple secondary windings on a single transformer assembly.

Another important object is to provide a converter where, in continuous conduction operation, essentially all transformer magnetizing energy is transferred through the secondaries to the load. This eliminates the need to minimize magnetizing current, and eliminates conduction losses associated with flowing and recirculating magnetizing current in the primary. A very important corollary object is to be able to utilize an air core transformer assembly.

A still further object is to provide a converter where, in discontinuous conduction, some of the magnetizing energy is returned through the primary winding, thus facilitating light load operation of the invention when implemented with full bridge zero voltage switching techniques.

A very important object is to be able to implement an embodiment of the converter of the instant invention utilizing an integrated magnetic assembly wherein all primary and secondary windings can be located on a single bobbin or core leg.

An object of the invention which is especially important for manufacture is to achieve full wave operation by employing symmetrical transformer assemblies which are virtually identical for manufacturing purposes, but which can be operated out of phase in pairs for realization of the electrical advantages of the invention.

Yet another object of the invention is to be able to enjoy especially advantageous implementation of the technology of Matrix Transformers, as taught in U.S. Pat. No. 4,665,357 to Herbert.

A further object is to be able to supplement the secondary windings of the converter, which operate in accordance with the principles of the present invention, with secondary windings which operate in accordance with principles of conventional Buck-derived converters, in order to simultaneously realize in a single converter the features and advantages of both.

These and other features and advantages of the invention will be apparent to those skilled in the art from the following detailed description of preferred embodiments, when considered in conjunction with the accompanying drawings, in which:

DETAILED DESCRIPTION

Figure 1:
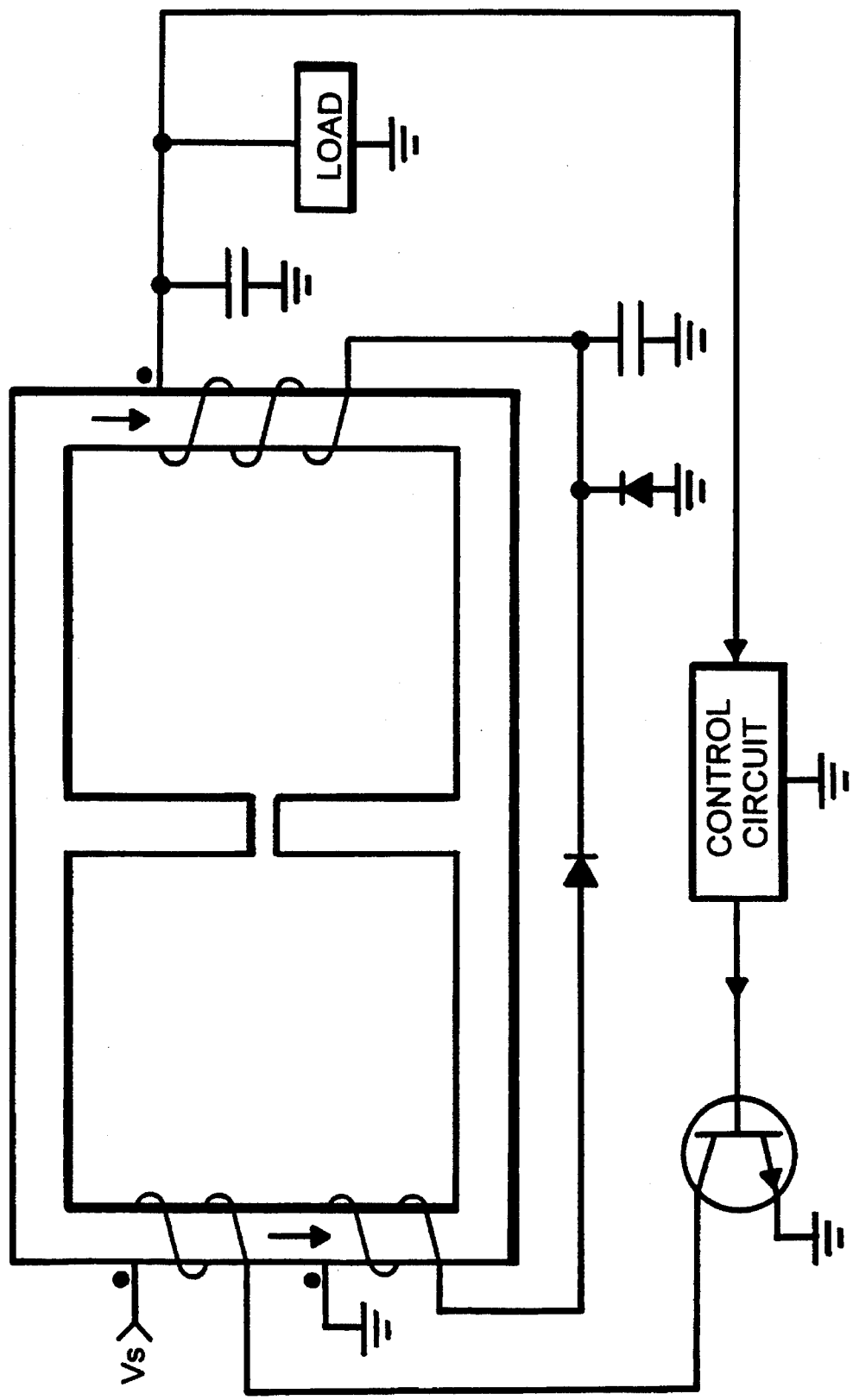
FIG. 1 illustrates a prior art converter having integrated magnetic functions.
Figure 2:
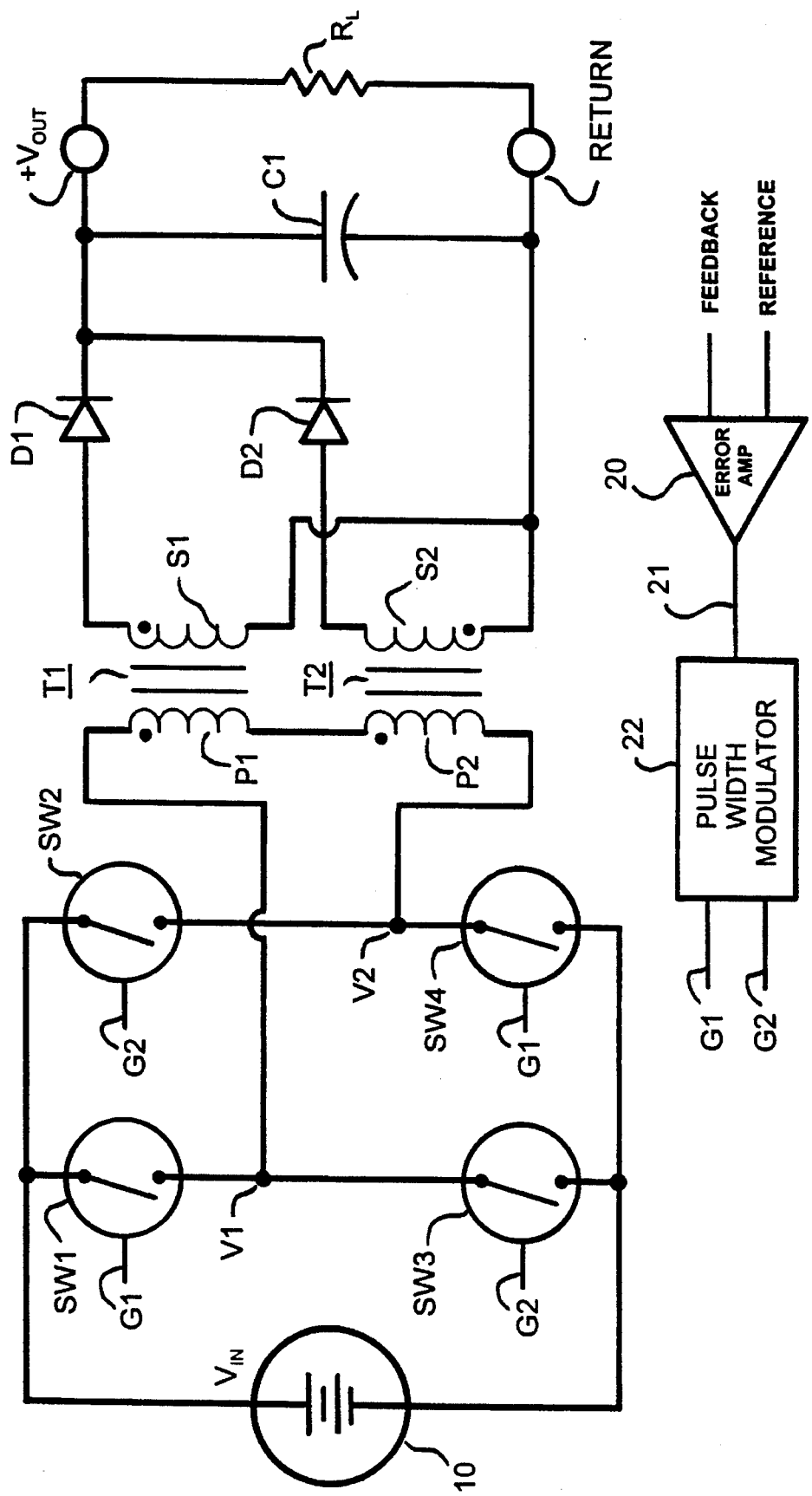
FIG. 2 illustrates an embodiment of the present invention which is implemented with two separate transformer structures.

An embodiment of the invention is shown in FIG. 2. The embodiment of FIG. 2 illustrates a form of the invention wherein a transformer function is realized by two separate transformer assemblies T1 and T2. Primary winding P1 is wound on T1 and primary winding P2 is wound on T2. P1 and P2 are connected in series. Four primary side switching elements SW1, SW2, SW3, and SW4 are connected in a full bridge configuration. A low impedance source of input voltage Vin is indicated at 10. Switches SW1 and SW3 are connected across voltage Vin, and one end of primary winding P1 is connected to the midpoint of the switch pair at V1. Switches SW2 and SW4 are connected across Vin, and one end of primary winding P2 is connected to the midpoint of the switch pair at V2.

Secondary winding S1 is wound on transformer T1, magnetically coupled to primary winding P1. Secondary winding S2 is wound on transformer T2, magnetically coupled to primary winding P2. Polarity of all windings is as shown by the conventional polarity dot notation. The cores of transformers T1 and T2 must be chosen or designed to be of a certain permeability with respect to the desired output power and operating frequency of the converter, as will be explained in greater detail herein. The cores of T1 and T2 are required to store an amount of energy for proper converter operation, and this amount of energy is approximately equal to or greater than ½ the output energy per half-cycle at the point of minimum input voltage. Storing energy greater than ½ the total minimizes the output ripple, as will be understood from the detailed descriptions herein. Therefore, core permeability is chosen so that at least the minimum energy is stored at the desired operating frequency. In the embodiment of FIG. 2, the amount of stored energy is chosen to be in the range of approximately 2 to 3 times the amount of energy released to the output each half-cycle of converter operation.

Rectifier D1 is connected in series with secondary winding S1 for rectifying current flow in S1; and Rectifier D2 is connected in series with secondary winding S2 for rectifying current flow in S2. Converter output connection terminals +Vout and RETURN are available for connecting to the load to be powered by the converter; connection +Vout will be positive with respect to RETURN. The cathodes of D1 and D2 are connected together, and connected to terminal +Vout. The ends of S1 and S2 which are opposite their respective connections with D1 and D2 are connected to terminal RETURN. An output smoothing and filtering capacitor C1 is connected across the terminals +Vout and RETURN. The converter delivers output power to a load shown at RL, which is connected across terminals +Vout and RETURN.

An error amplifier circuit, which may be any one of the many conventional types of error amplifier circuits already in common use, is indicated by a functional block at 20. The error amplifier 20 is connected to the power supply output through the FEEDBACK connection to sense the regulation of the output voltage in the conventional manner. The voltage at the FEEDBACK terminal is compared to a stable REFERENCE voltage so that an error signal is transmitted to a PULSE WIDTH MODULATOR circuit, shown as functional block 22, via connection 21. The PULSE WIDTH MODULATOR circuit has switch operating output control signals G1 and G2 for opening and closing the switches. The PULSE WIDTH MODULATOR operates the switches at a preferably fixed operating frequency, and adjusts the pulse width of the switch closed, or ON time, to achieve pulse width modulation. In response to the error input from the ERROR AMPLIFIER through connection 21, the PULSE WIDTH MODULATION circuit reduces the pulse width if the output tends to go out of regulation too high, or increases the pulse width if the output tends to go out of regulation too low. There are many standard pulse width modulation circuits now in common use, many implemented in integrated circuit format, which can be successfully employed in this capacity in this embodiment of the present invention. The outputs of PULSE WIDTH MODULATION circuit 22 are taken at control lines G1 and G2, which provide operating signals to the switches. The G1 and G2 signals are out of phase with each other to operate switches SW1 through SW4 in a full bridge pulse width modulation scheme. Signal G1 causes the switches SW1 and SW4 to close (switch ON) while switches SW2 and SW3 are open (switch OFF) by the appropriate command from G2. This causes point V1 to be connected to the positive side of source 10, and point V2 to be connected to the negative side of source 10. For the other half cycle the roles are reversed; G2 commands SW2 and SW3 ON while G1 commands SW1 and SW4 OFF. V1 is now connected to source 10 negative and V2 to source 10 positive. This action achieves the conventional full wave full bridge operation across the series connected primaries P1 and P2.

Primary windings P1 and P2 have an equal number of turns; and secondary windings S1 and S2 have an equal number of turns. The primary to secondary turns ratio is determined in accordance to the desired operating range of the converter, especially with regard to regulated output voltage and minimum input voltage levels. Embodiments of the converter such as that shown in FIG. 2 are capable of being designed to operate over many different ranges of input and output voltage by adjustment of turns ratio and appropriate selection of components, but, for the purpose of simplified explanation, a turns ratio of 1:2 Primary to Secondary has been chosen for the specific embodiment illustrated in FIG. 2. The 1:2 turns ratio is that which is necessary to operate this embodiment of the invention with Vin equal to or greater than +Vout, assuming all other components are ideal.

Operation

The description of the operation of the invention as illustrated in FIG. 2 will begin with a description of the general energy transfer principal from primary to secondary. The description will assume ideal components. Switches SW1, SW2, SW3, and SW4 form an inverter which periodically connects the voltage from voltage source 10 across the primary, reversing polarity on succeeding half-cycles, as described below. When control 22 activates control line G1, switches SW1 and SW4 close. The input voltage Vin is applied across the converter's primary winding, which consists of the series connection of transformer primary windings P1 and P2. The transformer polarities under these conditions are such that the dot ends of the windings are of positive polarity. Voltage is induced on the secondaries, which causes D1 to be forward biased and D2 to be reverse biased. Since D1 is forward biased, primary current flowing in P1 is transformer coupled through the turns ratio to secondary S1. This current flows through S1 and D1 to the load RL, with capacitor C1 smoothing any AC component (ripple). Since primaries P1 and P2 are in series, current flowing in them is the same. The P1 current can be accounted for by equal amp-turns of current in S1; however, since D2 is reverse biased, the P2 current must be supported by magnetizing flux in the core of T2. Thus, energy in P2 current flow acts to store energy as flux in T2. At the termination of this half cycle, as determined by control 22, SW1 and SW4 are switched OFF by signal line G1 and switches SW2 and SW3 are closed under command of control 22 by signal line G2. The polarity across the series connection of P1 and P2 reverses from the previous half cycle, and the dotted winding ends are now negative. Rectifier D1 is now reverse biased and D2 is forward biased, so current flow in S1 stops. Current flowing in P2 is now transformer coupled to cause current flow in S2 and D2, which results in current flow to the load, smoothed again by C1. Since current flow in P1 is equal to current flow in P2, but D1 is reverse biased, current in P1 cannot be due to reflected S1 current, and therefore P1 current must be supported by flux in the T1 core. This causes a flux increase in T1, resulting in an increase in stored T1 flux energy.

As has been previously mentioned, a 1:2 ratio of primary turns to secondary turns is the optimum ratio for converter operation in the specific case where the input voltage is equal to or somewhat greater than the output voltage. As a more general principle relating to the invention, covering a wider variety of contemplated combinations of input and output voltage, there is a desired operating point where the converter output voltage, as impressed across a conducting secondary winding, is reflected back to the primary side as no greater than ½ the input voltage. Consequently, the minimum input voltage for regulation under steady state conditions, assuming ideal components, is the point where the voltage across the secondary of each transformer, reflected back to the primary, is ½ of the input voltage. Under these conditions the converter could theoretically maintain steady state regulation, but could not respond well to an increase in load.

When the converter is operating as described above, and the input voltage is significantly greater than two times the reflected output voltage across the primary of the conducting transformer, the converter can better regulate and respond to dynamic conditions. When the input voltage is great enough to fulfill the minimum requirements, and understanding of the voltage conditions across the series connected primaries is facilitated. Since the voltage across the conducting secondary winding is clamped to the output voltage by the conducting rectifier, the primary of the conducting transformer is clamped to a voltage less than ½ of Vin. Thus, the remainder of the primary voltage, which is greater than ½ Vin, is impressed across the primary of the non-conducting transformer. Since the transformers are essentially symmetrical and operated out of phase from one another, this principle applies alternately to both of the series connected transformers.

From the standpoint of magnetic operation, it can be seen that transformer T1 provides a core for containing magnetizing flux that inductively couples primary P1 with secondary S1. Thus, the core of T1 provides the magnetic circuit for this T1 flux. Due to the selected permeability of the core, the flux in the core of T1 stores energy. This energy is released to the load as magnetizing current during D1 conduction. In the same manner, T2 provides a core and magnetic circuit which contains a separate magnetizing flux that couples P2 and S2. The T2 core permeability is selected to be essentially the same as the permeability of the T1 core, so that energy is stored in the T2 flux which is released as magnetizing current to the load during the conduction time of D2. The magnetic circuits of T1 and T2 are completely separate and independent. However, the primary circuit increases flux in both magnetic circuits due to the series connection of P1 and P2, and magnetizing current due to flux in one transformer can be transformer coupled to the output winding of the other transformer during primary conduction due to this series primary connection. For the desired operating characteristics of the invention where energy stored in flux fields is released to support output current, the fields of both magnetic circuits must co-exist. This simultaneous existance is required since the above-described energy interchange operates effectively by shuttling energy in an inductively coupled fashion between magnetic circuits.

It is clear from the foregoing description that, for each half-cycle during primary conduction, one of the two series transformers has a conducting secondary while the other does not. Thus, the transformer with the non conducting secondary acts as a series inductor in the primary circuit. This has several advantageous effects on converter operation. One effect is to impart the advantages of current-fed operation to the converter. For a current-fed converter, an output short circuit will not cause a runaway instantaneous primary current increase condition. Rather, under short circuit conditions, rate of rise of primary current will be limited by the value of the series inductance of the non-conducting transformer.

Figure 3:
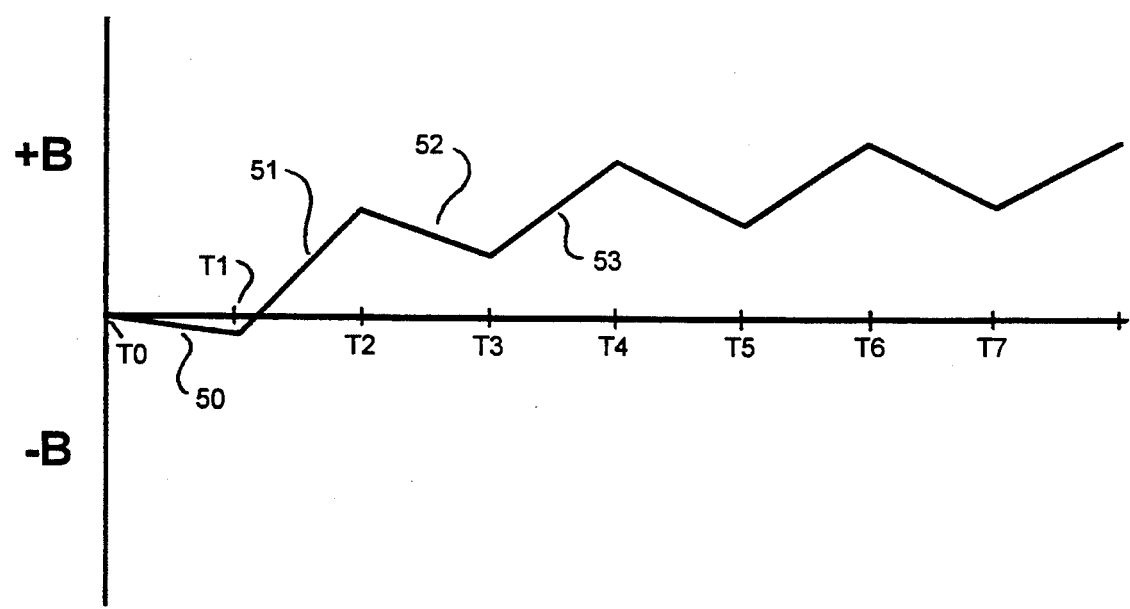
FIG. 3 is a waveform illustrating flux polarity and level as the converter of the present invention is switched on and transitions into continuous conduction operation.

From the description thus far, it can be clearly seen that there is a symmetrical but out of phase operation between the transformers where the output rectifiers alternate in conduction. A transformer with a non-conducting secondary stores energy. This stored energy is important to the operation of the invention. More detailed specifics will now become more clear from an increasingly detailed description which includes the effect of flux conditions and pulse width. The flux relationships in the transformer will now be examined via an explanation of operating conditions during start up of the converter. FIG. 3 is a graph which illustrates, over several switching cycles, the flux change in transformer T1 when the converter of FIG. 2 starts. In FIG. 3, the vertical portion of the graph above the horizontal axis represents +B, where B is the transformer flux level on an arbitrary scale, and positive is arbitrarily the direction of flux when D1 is reverse biased. The part below the horizontal axis represents −B. The horizontal axis of the graph is a time scale with respect to switching half cycles of the primary. During startup, the control 22 senses the output voltage well below regulation (near zero), and commands full pulse width so that the SW1–SW4 pair is ON for about 50% of a cycle, and similarly the SW2–SW3 pair is ON for the other 50%. Assume Vin is slightly greater than the desired regulated point of +Vout. Time T0 is the moment of startup, when control 22 switches on the SW1–SW4 switch pair. At the moment of startup, the flux in T1 and T2 is zero. When SW1 and SW4 are conducting, D1 is forward biased, so S1 is clamped to essentially zero volts initially. With near-zero volts/turn, there is very little flux change in T1, as shown by the small change between times T0 and T1 along line 50. However, C1 will begin to accumulate a charge since S1 current flows into C1 while primary current is increasing. At T1, control 22 terminates conduction through the SW1–SW4 pair, and initiates conduction through SW2 and SW3 to reverse polarities across the transformer. With SW2 and SW3 conducting, D2 now conducts, clamping the primary P2 to the very low voltage across C1. Therefore, very little of Vin is dropped across P2, and most of Vin appears across P1. This causes a rapid change of flux in T1 in the positive direction, as shown along line 51 between times T1 and T2. During time T1 to T2, C1 charges to an appreciable voltage level, so significant primary voltage now is dropped across the primary of the conducting transformer. For time T2 to T3 the SW1–SW4 pair conducts, and the T1 flux changes at a more rapid rate, as shown along line 52. This action continues as described, with the rate of change of flux in T1 reflecting the conditions of input and output voltage. Between T6 and T7 it can be seen that the flux changes are tending toward a steady state condition, which can be shown to occur when Vin and +Vout are equal, under continuous conduction operating conditions. However, a net flux has accumulated in T1 which does not go to zero over one switching cycle during normal operation. The above description applies equally to transformer T2 when considered in conjunction with S2 and D2, and allows it to be understood that an equivalent flux level exists in T2 for the same reasons.

From the above description, a very interesting characteristic of the flux conditions can be seen. It will be observed from FIG. 3 that, when D1 is conduction, the flux in T1 is decreasing. A decrease in flux must be associated with removal of energy from the magnetic system. As previously described, core permeability is chosen to be low enough such that substantial energy is stored. Therefore, the decreasing flux of T1 during the time that D1 is forward biased due to primary winding conditions means that the magnetizing current of T1 is flowing in D1. Therefore, substantial magnetizing current is flowing in D1 simultaneously with reflected primary current from P1. This summed current is delivered to the load.

Up to this point, converter operation has been explained in terms of a duty cycle of 50%, with virtually no time where either of the SW1–SW4 or SW2–SW3 switch pairs is not conducting. In operation, however, the converter is pulse width modulated (PWM). Pulse width modulation requires, in a fixed-frequency full wave converter, that there will be some "dead time". Dead time is a term of art which refers to the time between switch conduction intervals. Depending upon the specific control method chosen, dead time typically effects opening of the primary circuit, although there are some advantageous implementations of pulse width modulation in which the primary is short circuited to effect a dead time. Referring to FIG. 2, and in view of the foregoing explanations, converter dead time conditions can now be understood. In steady state operation, both T1 and T2 had stored levels of flux which remained non-zero from cycle to cycle. Furthermore, when the secondary of a transformer forward biased its output rectifier, the collapsing flux field of the transformer was able to cause magnetizing current to flow in the associated rectifier. This principle is true of both transformer; that is, they can discharge their magnetizing flux as magnetizing current in their associated secondary winding. Referring now to FIG. 2, assume that all switches are open and that flux exists in both transformers. With the primary open, sufficient amp-turns of magnetizing current must flow to support core flux levels. Thus, both transformers will forward bias their associated rectifiers during the dead time, and both D1 and D2 will simultaneously flow magnetizing current from their associated transformers to the load. In this manner current is provided to the load during dead time, and current flows as previously described when the switch pairs are ON. Hence, continuous current is delivered to the load, despite varying pulse widths and dead times.

It has been shown from the description of the invention thus far that primary current flows across the series connection of primaries P1 and P2 when switches are conducting. However, a further understanding is necessary of what determines the magnitude of primary circuit current. When SW1 and SW4 are conducting, S1 is clamped to +Vout through D1, so T1 reflects a voltage sink to the primary P1, and thus cannot normally act to control or limit primary circuit current flow as long as Vin is greater than ½ +Vout. Therefore, under the desired conditions where Vin is greater than +Vout there must be some control over the rate of primary circuit current flow. It can now be more easily seen that T2 controls primary circuit current when SW1 and SW4 conduct, and that T1 controls primary circuit current when SW2 and SW3 conduct. During SW1–SW4 conduction, D2 is reverse biased and S2 does not conduct, so T2 appears to the primary circuit as an inductor. During steady state operation, as will be recalled from the above description of flux conditions, T2 has a level of flux present which resulted from P2 primary voltage during the time D1 was in conduction. Thus, during SW1–SW4 conduction, the magnitude of primary circuit current through the P1–P2 series connection is equal to the magnetizing current of T2, and the rate of increase of total primary current is determined by the inductance of T2 as referred to winding P2, and the voltage across P2. Furthermore, it can now be further understood that when SW1 and SW4 conduct, the primary current supports the magnetizing current of T2, and that T1 is acting as a current transformer, coupling this current across the P1/S1 turns ratio to become current to the load. The same principles apply to the other half-cycle of converter operation, when SW2 and SW3 conduct: T1 is the inductance, and T2 the current transformer, so the T1 magnetizing current becomes the total primary circuit current, and T2 now acts as a current transformer to couple this current through S2 and D2 to the load.

For a better understanding of how pulse width modulation allows the converter to provide continuous current to an output that is regulated against changes in input voltage and load, reference is had to FIG. 4. In FIG. 4, various current waveforms are shown which are associated with primary and secondary windings of the converter of FIG. 2 when in steady state regulated operation. The waveforms of FIG. 4 assume conditions of Vin being approximately ⅓ higher than +Vout, and sufficient load so that the converter is operating in the continuous conduction mode.

Figure 4A:
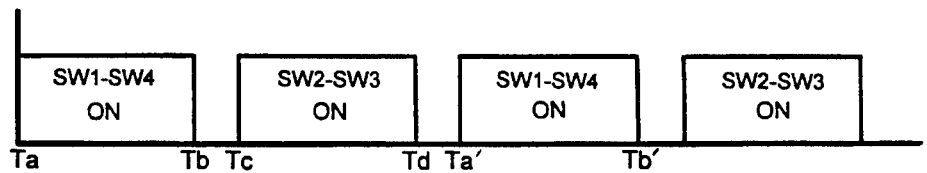
FIG. 4 illustrates current waveforms in various circuits of the invention.
Figure 4B:
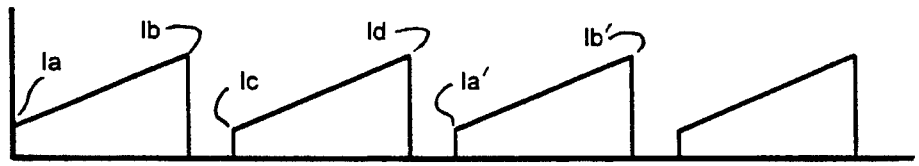
Figure 4C:
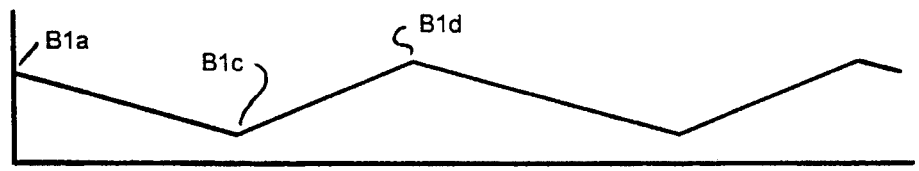
Figure 4D:
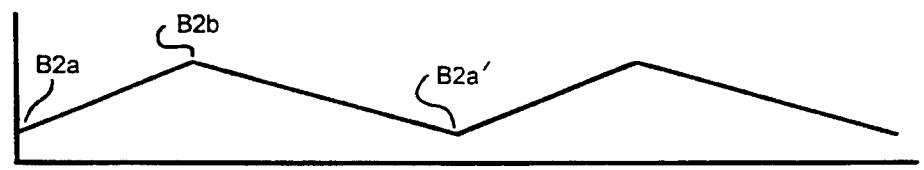
Figure 4E:
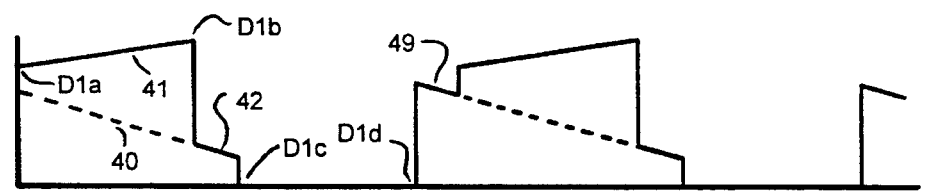
Figure 4F:
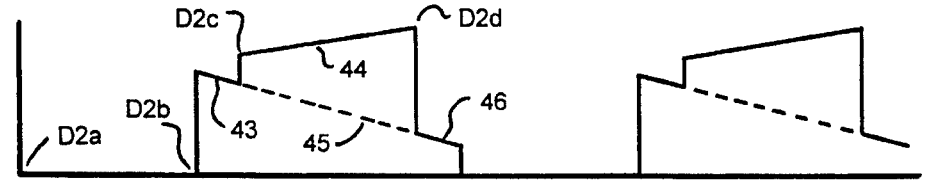
Figure 4G:
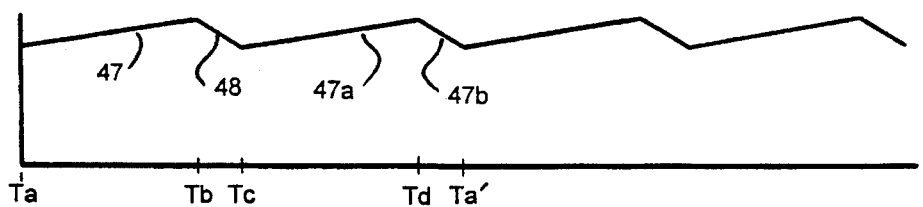

FIG. 4a illustrates a timing diagram of conduction time for the switch pairs SW1–SW4 and SW2–SW3. FIG. 4b illustrates, with respect to switch timing, the absolute value of the current waveform for the current flowing in the primary circuit which is the series connected circuit of P1 and P2. FIG. 4c illustrates the flux level in T1 with respect to switch timing. FIG. 4d illustrates the flux level in T2 with respect to switch timing. FIG. 4e illustrates the current flow in D1 with respect to switch timing. FIG. 4f illustrates the current flow in D2 with respect to switch timing. FIG. 4g illustrates the sum of the D1 and D2 currents into C1, with respect to switch timing.

The explanation of the operation of the embodiment of FIG. 2 taken together with the waveforms of FIG. 4 assumes the desired mode of operation of the invention where the magnetics are in continuous conduction mode; that is, the flux in the transformers does not return to zero. From FIG. 4a, the switch duty cycle is less than 50%, such that there is appreciable dead time between alternate switch pair conduction times. Time Ta is the initiation of the conduction time of switch pair SW1–SW4. At this time, D1 is forward biased and D2 is reverse biased. T2 is acting as a series inductance for the primary, and T1 is a current transformer for the P1–P2 primary current. Thus, the current flowing in the primary is the amp-turns necessary to support the magnetizing flux in T2. This current is illustrated in FIG. 4b as the initial primary current at Ia. During this phase, flux in T2 is increasing, as can be seen from FIG. 4d starting at point B2a. The flux in T1 during this time is decreasing, as can be seen from FIG. 4c starting at point B1a. The decreasing flux level in T1 is a result of magnetizing current flowing in D1, as previously described. The rate of rise of the flux in T2, as shown in FIG. 4d is a function of the voltage across P2, which is proportional to the difference between the input voltage minus the voltage across P1. The rate of decrease of the flux in T1 is a function only of the output voltage for any time when D1 is conducting, since the volts per turn of T1 is fixed due to the conduction of D1. Thus, for the conduction time of the SW1–SW4 pair, flux in T2 increases. At Tb of FIG. 4a, the SW1–SW4 switch pair ceases conduction, and the dead time between Tb and Tc begins. FIG. 4b illustrates the upward-ramping primary current between times Ta and Tb. It will be recalled that this current is the amp-turns necessary to support the magnetizing flux in T2; the upward slope reflects the increase in T2 flux. This increase is shown in FIG. 4d, between B2a and B2b. Simultaneously, T1 flux is decreasing, due to release of magnetizing energy, as shown in FIG. 4c between points B1a and B1c.

At time Tb the switches SW1 and SW4 switch OFF, and primary current flow ceases, as can be seen at Ib in FIG. 4b. Referring to FIG. 4e, the current through D1, as previously discussed, is the sum of T1 magnetizing current and turns ratio reflected P1 current. In FIG. 4e, at point D1a, the D1 current is shown to be this sum. The dashed line part 40 of the current is the component of current due to magnetizing current of T1, and is sloping downward due to the decreasing flux. The upward sloping solid line 41 illustrates the summed current; the amount of current below the dashed line 40 is the T1 magnetizing current, and the amount of current above the dashed line 40 is the current induced in S1 from P1, which is the turns ratio reflection of the T2 magnetizing current. However, the T2 magnetizing current has been induced into the primary, by current transformer action, as ½ of what it would have been if it had been flowing in D2. The P1:S1 turns ratio is 1:2, so the reflection into S1 is such that the current induced in S1 by P1 is the actual secondary-referred amp-turns of T2 magnetizing current. Thus, it can be seen that the magnitude of D1 current can be determined directly as the sum of the T1 and T2 magnetizing currents, even though the component from T2 is coupled through the primary windings. During the SW1–SW4 conduction time, D2 is reversed biased, and there is no D2 current flow. This is illustrated in FIG. 4f between points D2a and D2b.

At time Tb, the switches are OFF. Primary conduction has terminated, as shown in FIG. 4b just after point Ib, but the magnetizing flux of the transformers must still be accounted for by current flow. Collapsing flux in T1 and T2 now forward biases D1 and D2 respectively, as previously discussed. Hence, the T1 magnetizing current is flowing in D1, and the T2 magnetizing current is flowing in D2. As seen by line 40 in FIG. 4e, D1 was conducting T1 magnetizing current even during the time period Ta to Tb, so in actuality T1 magnetizing current continues to flow in D1 uninterrupted, despite the termination of switch conduction at time Tb. This can be seen in FIG. 4e at line 42, which is the extension of the dashed line 40 beyond point D1b. However, at point D1b the termination of the induced current component from P1 can be clearly seen. Hence, the total D1 current now consists only of T1 magnetizing current, which becomes more clear by noting that line 42 is the extension of line 40. D2 now conducts the T2 magnetizing current, which can be seen at point D2b in FIG. 4f. During the dead time between Tb and Tc, magnetizing current from both T1 and T2 is delivered to the load, and the current diminishes as the fluxes decrease. This is shown for T1 in FIG. 4e as line 42, and in for T2 in FIG. 4f as line 43. The magnitude of current shown at line 43 is higher than the magnitude of current shown at line 42, since T2 has just been charged by primary circuit energy, so the flux level is greater, as has been previously discussed.

FIG. 4a illustrates the conduction time of the SW2–SW3 switch pair between times Tc and Td, which initiates the second half-cycle of full wave operation. During this time, the transformers change roles, but respective operation during this second half-cycle can easily be understood as being identical to that described for the first half-cycle. Now, D2 is forward biased and D1 is reverse biased. Primary current flow, as shown from Ic to Id in FIG. 4b, begins as the primary flows the T1 magnetizing current. FIG. 4e shows the absence of D1 current between times D1c and D1d. FIG. 4f shows the D2 current between D2c and D2d. The D2 current now consists of a T2 magnetizing component and a component induced from P2. The magnetizing component is shown in FIG. 4f by dashed line 45, and the current induced from P2 sums with this current to produce the total current as shown by line 44. Flux in T1 is increasing due to added primary energy, as shown in FIG. 4c between B1c and B1d; and T2 flux is decreasing, as shown in FIG. 4d between B2b and B2a'.

At time Td, shown in FIG. 4a, all switches are OFF and a dead time period begins. D1 and D2 are forward biased. FIG. 4e illustrates D1 current beginning at point D1d and decreasing as shown by line 49. FIG. 4f illustrates D2 current beginning at point D2d and decreasing as shown by line 46.

At time Ta', the operating cycle begins over again.

FIG. 4g illustrates the current into smoothing capacitor C1, which is the sum of the D1 and D2 currents. Line 47 illustrates this summed current during SW1–SW4 conduction. During this time, only D1 is conducting, so line 47 illustrates a current which is identical to the current shown in FIG. 4e at line 41. This current waveform has an upward slope, since the magnetizing current in T2 is increasing more rapidly than the rate of decrease of magnetizing current in T1. Beginning at time Tb, all switches are OFF. Both D1 and D2 now conduct to provide a summed current into C1. It should be noted that, between times Ta and Tb, both T1 and T2 magnetizing current flowed in D1; T1 current directly and T2 current indirectly. From the foregoing discussion, it will be recalled that the magnetizing current of the nonconducting transformer is reflected through the primary circuit to the conducting transformer. Thus, when the dead time begins, the total transformer output current does not change, since the only functional change in converter operation has been that the transformer with the formerly nonconducting secondary now begins to conduct its own magnetizing current, rather than refer it to the other transformer through the primary. Thus, in FIG. 4g at time Tb, the summed current does not change, and line 48 appears as a continuation of line 47, except for slope. The negative slope of current as shown by line 48 is due to the fact that now both transformer fluxes are decreasing, since no primary energy is being added to either transformer when the primary is open.

At time Tc, the SW2–SW3 switch pair conducts, and D1 becomes reverse biased. Total C1 input current is now identical to the D2 current, which is illustrated in FIG. 4f at line 44. At time Tc, the T1 magnetizing current which was flowing in D1 transitions to primary current flow which is transformer coupled to S2 to become D2 current flow. However, the magnitude of this current does not change. Thus, the total secondary current flow does not change, and current illustrated at line 47a becomes a continuation of the current shown by line 48. During the ensuing dead time between Td and Ta', both transformers discharge their magnetizing current through their respective output winding and rectifier, to yield the output current sum as illustrated by line 47b in FIG. 4g.

From the foregoing description, and especially with reference to the current waveforms illustrated in FIG. 4g, a very advantageous aspect of the operation of the present invention becomes clear. The output current of the secondary windings yields continuous current operation, with no supplemental series inductor required. Energy required for output filtering is stored magnetically and provided to the output as required due to an inherent function of transformer operation. Thus, the magnetics of the present invention functionally integrate both the transformer and filter inductor.

From the above description, it can now be understood that the magnitude of the output current of the transformers is dependent upon flux levels in the transformers, since average output current is equal to the sum of the average transformer magnetizing currents as referred to the secondary windings. So, regulating the converter to provide various output currents can be accomplished by adjusting the flux levels in the transformers to accomodate current required by the load being supplied from the present invention. In order to operate in steady state regulated conditions, the average flux in either of the transformers remains at a constant value. Since flux change for an inductor depends on volts per turn times time, the volts/turn x time for charging must equal the volts/turn x time for discharging. Each transformer charges alternately due to voltage across the primary winding during switch ON time, and discharges through the secondary output rectifier when not charging. As converter input voltage changes, primary winding voltage changes for the charging transformer. However, for regulated output conditions, the discharge voltage is the regulated output voltage, and does not change. To maintain steady state operation under conditions of constant output voltage but varying input voltage, the ON time, hence duty cycle, must change. In a similar manner, changing the output voltage for a constant input voltage can be accomplished by varying the duty cycle. Thus, the converter can be regulated against changes in input or output voltage by duty cycle control, which is advantageously accomplished by virtually any of the Pulse Width Modulation techniques and circuits which are well known in the art. With reference to FIG. 2, error amplifier 20 measures the output voltage and compares it to a reference voltage in the well known manner. If the output voltage is determined by the error amplifier to be of the correct value, error amplifier 20 causes the signal line 21 to carry no error signal to pulse width modulation circuit 22, and the duty cycle of the converter remains constant. If the output voltage is lower than desired, error amplifier transmits a signal to pulse width modulation circuit 22 via signal line 21 which causes an increased duty cycle. If the output is higher than desired, the error amplifier causes the pulse width modulator to decrease the duty cycle. It can be demonstrated by analysis that the steady state transfer function of the converter according to the present invention, when operated in the continuous conduction mode, is similar to that of conventional isolated Buck-derived converters.

Figure 5A:
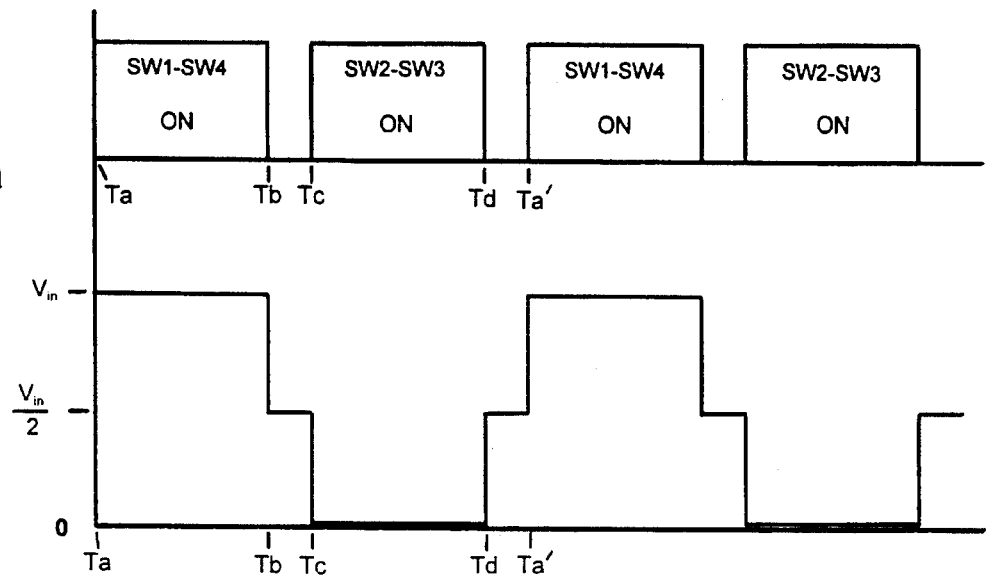
FIG. 5 illustrates voltage waveforms for two operating conditions.

FIG. 5a illustrates voltage waveforms of the primary circuit of the invention of FIG. 2, operated as described to give the current waveforms of FIG. 4. In FIG. 5a, V1 and V2 are voltage test points. The voltage at circuit test point V1 is shown with respect to the negative end of voltage source 10. When the SW1–SW4 switch pair is conducting, between Ta and Tb, point V1 is at the positive potential of Vin since SW1 is closed. Between Tb and Tc, the primary is open. Both T1 and T2 forward bias their respective output rectifiers, so the reflected voltages to P1 and P2 are equal. However, the polarities are opposite, so the voltage across the series connection of P1 and P2 between points V1 and V2 is zero. Since the magnetizing current of both transformers is flowing in the secondaries, primary voltage is not influenced by current flow. Therefore, for the time between Tb and Tc, the primary will tend to float at essentially ½ of Vin. Between Tc and Td, SW3 connects V1 to the negative side of Vin. From Td to Ta' the primary is open, so the points V1 and V2 tend to float at about ½ Vin.

Figure 5B:
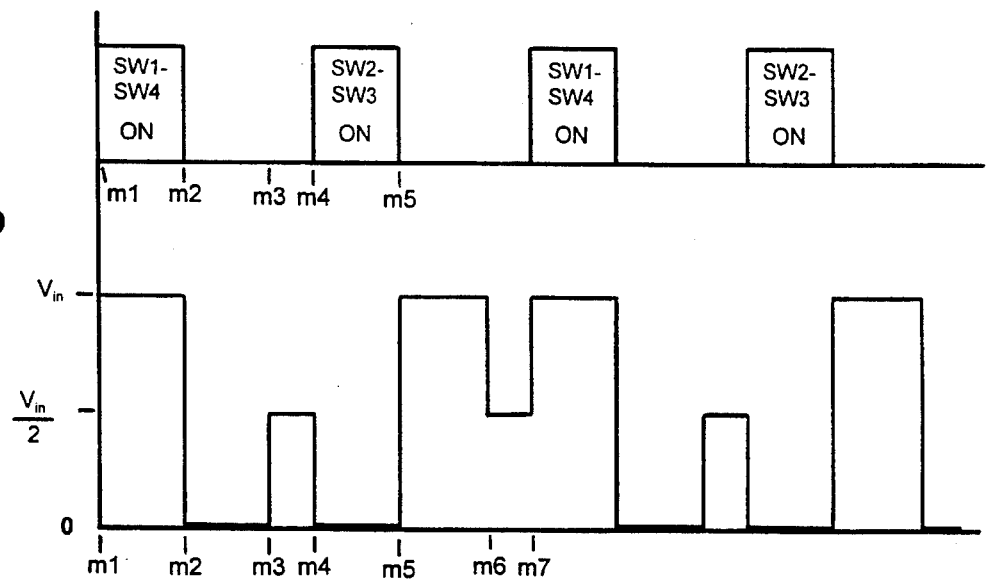

The description of the operation of the invention has so far emphasized the desired mode of continuous conduction. However, the converter also is capable of operating in discontinuous conduction, and possesses still further operating virtues when used in this mode. Recall from the description of the continuous conduction mode that an output rectifier conducted both magnetizing current and reflected primary current during switch conduction times. This required that the flux level of the conducting transformer decrease towards zero in a direction which forward biases the rectifier, but not completely collapse to zero. Thus, essentially all magnetizing current is able to flow in the secondary without any flow in the primary circuit required. In the discontinuous mode, flux in the secondary-conducting transformer starts at zero, and increases in a direction that will not allow the corresponding output rectifier to forward bias upon opening of the primary circuit. Therefore, any remaining flux in the transformer when the primary circuit opens will cause magnetizing current to continue to flow in the primary. This current must be dissipated or clamped in order not to overstress circuit components. If this primary magnetizing current is clamped through antiparallel rectifiers around the switches, such as those shown as CR1 through CR4 in FIG. 13. The voltage across the series connected primaries will reverse after switch commutation until the magnetizing current goes to zero. This action is illustrated in FIG. 5b. From time m1 to m2, the SW1–SW4 switch pair conducts, causing test point V1 to be at the Vin potential. At time m2, all switches are open and the dead time begins. Primary magnetizing current flow reverses the polarity across the series connection of P1 and P2, and magnetizing current returns to the voltage source Vin through antiparallel diodes connected across SW2 and SW3. This causes point V1 to go to the Vin return potential, since the SW3 antiparallel rectifier is conducting. At time m3, primary magnetizing current flow ceases, the voltage from V1 to V2 goes to zero, and V1 floats at essentially ½ Vin. At time m4, the SW2–SW3 switch pair conducts, causing V1 to go to the Vin return potential. During the dead time beginning at time m5, the primary magnetizing current flows through antiparallel rectifiers across SW1 and SW4, which causes point V1 to go to the potential of Vin until magnetizing flow ceases at time m6. Between times m6 and m7 there is no primary current flow, so V1 and V2 float at approximately ½ Vin.

Since, during discontinuous conduction, some magnetizing energy is returned to the primary rather than coupled to the secondary, duty cycle must be adjusted to accomodate output regulation requirements as well as providing magnetizing energy which must be recirculated.

The return of transformer magnetizing current through antiparallel rectifiers across the switches in a bridge configuration has certain advantages, particularly when employed with a bridge type zero voltage switching circuit, such as that taught in U.S. Pat. No. 4,864,479 to Steigerwald et al. In the converter of the Steigerwald patent, current flow in the leakage inductance is used to losslessly reset primary circuit capacitance to reverse the primary polarity between half cycles. In some implementations, the primary capacitance may be just the parasitic capacitance associated with the windings and solid state switches. However, additional capacitance can be added to slow dV/dT for reducing EMI. Additional capacitance would reduce EMI even in a conventional bridge switching circuit, but would result in unacceptably large losses in snubbing resistors. In the Steigerwald approach, leakage inductance current losslessly charges and discharges even augmented values of primary capacitance, allowing high frequency/low EMI operation. However, in the Steigerwald circuit, magnetizing current cannot participate in this process, since the transformer output is effectively short circuited by simultaneous output rectifier conduction during the dead time. At light loading conditions, the leakage inductance current becomes insufficient to fully reset the primary capacitance, which results in accomplishing the remainder of the reset dissipatively across the switching elements. This causes undesirable losses in the switching elements, and results in an increase in EMI. If the Steigerwald inverter is employed in conjunction with the present invention, at light loads the aforementioned recycled light load magnetizing current enhances the current flowing in any leakage inductance to reset the voltage across the capacitors, resulting in a still further reduction of losses and less EMI for very light load operation.

Figure 6A:
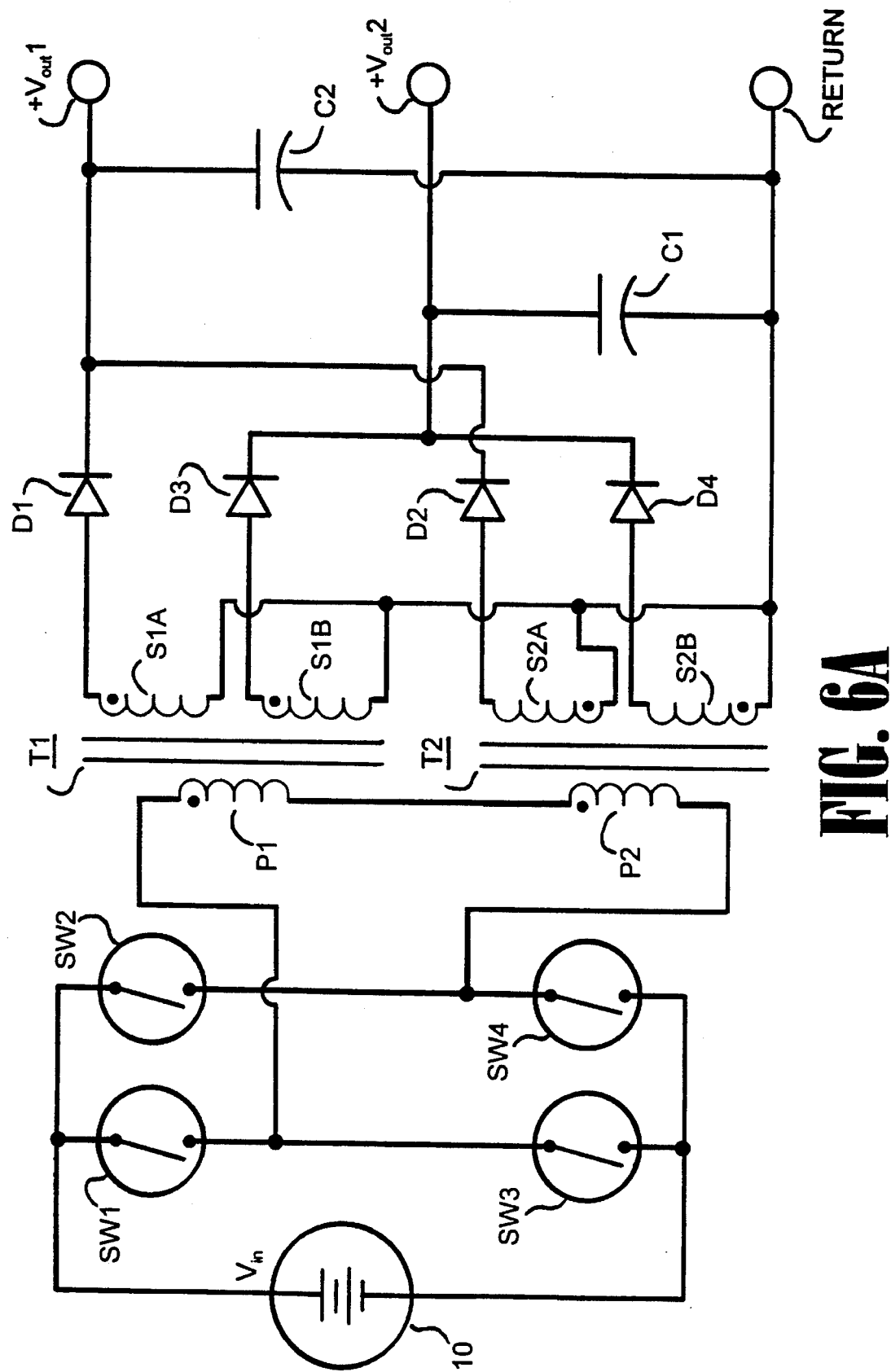
FIGS. 6A and 6B are embodiments of the invention which have multiple outputs implemented using auxiliary secondary circuits.

Referring now to FIG. 6A, a multiple output embodiment of the invention is illustrated. In FIG. 6A, a low impedance voltage source 10 provides current to a full bridge switching primary. Switches SW1 and SW4 conduct as a pair for one half-cycle, while SW2 and SW3 conduct as a pair for the other half-cycle, as for a conventional full bridge. Transformer T1 has primary winding P1 and secondaries S1A and S1B. Transformer T2 has primary winding P2 and secondaries S2A and S2B. Primaries P1 and P2 are connected in series, and winding polarities are indicated by phase dots. Windings S1B and S2B are rectified by rectifiers D3 and D4, respectively. Windings S1A and S2A are rectified by rectifiers D1 and D2 respectively. Output terminal +Vout1 receives current from D1 and D2, and is filtered by output smoothing capacitor C2. Output terminal +Vout2 receives current from D3 and D4, and is filtered by output smoothing capacitor C1. The invention of FIG. 6A operates just as for that of FIG. 2, except that the stored flux in T1 and T2 must now be divided to supply the output currents for +Vout1 and +Vout2. The current waveforms through the output rectifiers D1 and D2 in continuous conduction are just as for rectifiers D1 and D2 of FIG. 2 when in continuous conduction. The current waveforms through D3 and D4 in continuous conduction are just as for D1 and D2 of FIG. 2 under the same circumstances. The primary current waveform for FIG. 6A is identical to that of FIG. 2, and reflects the magnetizing current of the non-conducting transformer for each half-cycle. Thus, the magnetizing current from the transformers merely divides to supply the current required from each output. Thus, the windings operate effectively in parallel, but each according to the principles as described for the embodiment of FIG. 2. The pulse width modulation feedback loop may be closed around only one of the outputs, if desired, since the other output will track due to transformer coupling with respect to the number of turns on secondary windings. Thus, the output voltage of auxiliary secondaries will be the secondary turns ratio of the auxiliary to the winding around which the loop is closed, as is the case for multiple outputs on the well known flyback converter.

Figure 6B:
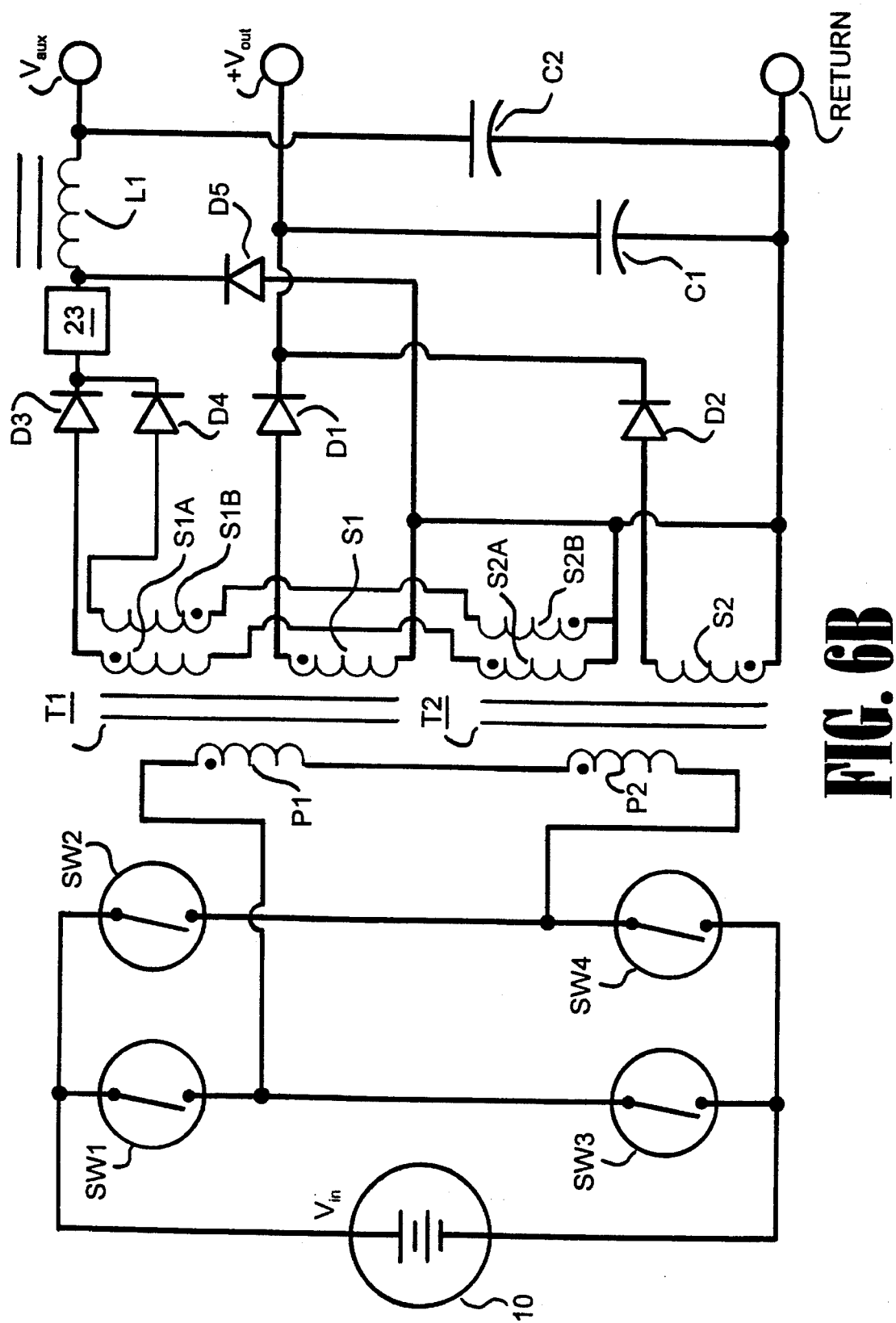

FIG. 6B illustrates another embodiment which achieves multiple outputs from a converter according to the present invention. In FIG. 6B, a primary is configured the same way as for the converters of FIGS. 2 and 6A, in a full wave full bridge. Transformers T1 and T2 have primary windings P1 and P2 respectively, which are connected in series. Secondary windings S1 and S2 are wound on T1 and T2 respectively, and operate to supply current to output +Vout just as illustrated and described for the embodiment of FIG. 2. However, additional secondary windings S1A and S1B are wound on T1, and S2A and S2B are wound on T2. Secondary windings S1A and S2A are connected in series, and secondary windings S1B and S2B are connected in series. Rectifier D3 rectifies the output of the series connected secondaries S1A and S2A, while rectifier D4 rectifies the outputs of the series connected secondaries S1B and S2B. The cathodes of D3 and D4 are connected together, and may also be connected to optional freewheeling rectifier D5 which has its anode connected to RETURN. Output smoothing inductor L1 is connected in series between the rectifier cathodes and output terminal +Vaux. Capacitor C2 is connected across output terminals +Vaux and RETURN for output smoothing. An optional separate pulse width modulation switching device, such as a magnetic amplifier or switching transistor may be connected in series with L1 as shown at 23. Noting the phase dot relationships of the transformers, either D3 or D4 is forward biased for alternate primary switching half cycles. Further, the voltages across the series connected secondaries add, which must be taken into account when determining the turns ratio of these secondaries to achieve a desired output voltage. When the SW1–SW4 pair conducts, D3 is forward biased, since both of the series connected secondaries in series with D3 are polarized the same direction, which tends to forward bias D3. When the SW2–SW3 pair conduct, D3 is reverse biased and D4 is forward biased, as can be seen from the phase dots on secondaries S1B and S2B. Thus, inductor L1 has positive voltage pulses imposed on the rectifier cathode connection for each half cycle. During primary side dead time, L1 inductor current flows through either through D3 and D4 simultaneously, or through D5, if employed. Capacitor C2 smooths the output current ripple. It can be seen that this action is the same as for a conventional Buck-derived full wave converter, and that the output voltage at Vaux is the L1 inductor averaged voltage of the pulsed voltage waveform applied across L1. In effect, the embodiment of FIG. 6B is a converter according to the present invention described for FIG. 2 as regards the operation of secondaries fed by S1 and S2, and a Buck-derived converter as regards the operation of the output containing L1 and the secondaries S1A, S2A, S1B, and S2B which provide it current. Current in the primary circuit is the turns ratio reflected sum of the output currents of the secondary windings of both outputs. Furthermore, a switching element may be imposed in the circuit as illustrated at 23 for the purpose of secondary pulse width modulation to control the voltage at the output Vaux. Performing secondary PWM in this manner would require the addition of the freewheeling rectifier D5 in the circuit as shown. An auxiliary winding as shown provides an excellent way of providing a closely regulated auxiliary output for a converter according to the present invention.

From the description of the invention so far, it has been shown that the invention provides advantageous operation by virtue of integrating the function of the transformer and filter inductor into the same magnetic circuit. However, since the invention is full wave operated, two cooperating phase-opposed magnetic circuits are required. The embodiment of FIG. 2 implemented these phase-opposed circuits as two physically independent transformers. It is, however, possible to realize even simpler and more compact embodiments of the converter of the present invention with other magnetic constructions where not only are magnetic functions integrated, but there is simultaneously integration of flux paths. Thus, integrated magnetic techniques can be employed which combine flux paths as well as permitting the functional integration that has been taught in the foregoing descriptions of operation of the invention where the transformer functions were achieved by two physically separate transformers.

Figure 7:
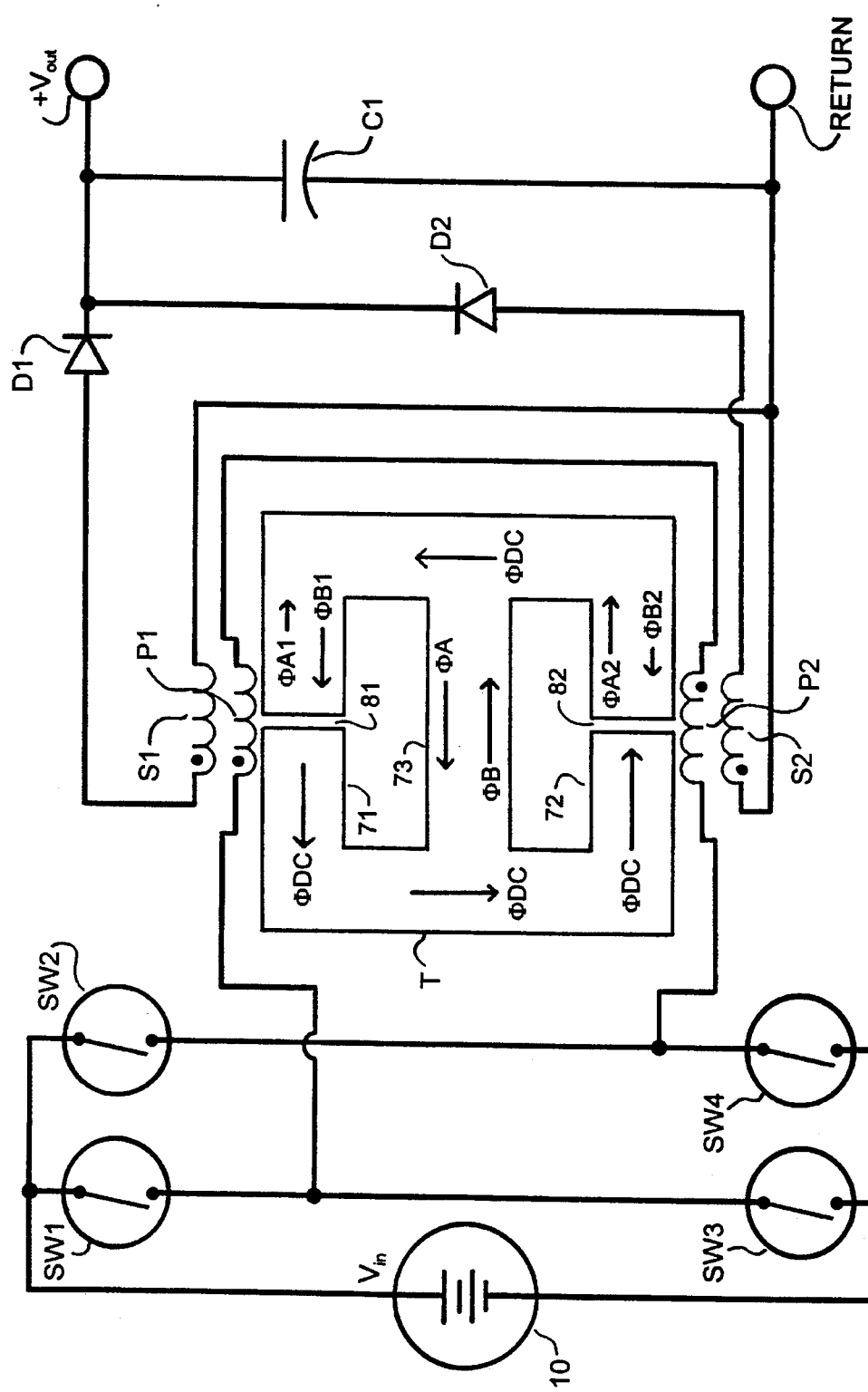
FIG. 7 is a semi-schematic diagram of an alternative embodiment where the invention is implemented in an integrated magnetic E-core structure.

FIG. 7 illustrates an integrated magnetic construction of the invention wherein the two transformers are implemented in a magnetic construction wherein flux paths are shared. In FIG. 7, a voltage source 10 provides voltage to a full bridge consisting of switching elements SW1, SW2, SW3, and SW4, which operate in pairs under control of a pulse width modulation control circuit, as was described for the embodiment of FIG. 2. A three-leg magnetic circuit is implemented in a ferrite core transformer, generally indicated at T. Transformer T has center core leg 73, and outer core legs 71 and 72. Core leg 71 has gap 81, and core leg 72 has gap 82. Gaps 81 and 82 are designed such that sufficient energy is stored by flux as described for the operation of FIG. 2, that is, so that a quantity of energy of at least approximately ½ the output energy per half-cycle is stored in the gaps. Further, the gaps should be essentially equal such that the reluctance of the magnetic paths of legs 71 and 72 are essentially equal. Primary winding P1 is wound on leg 71, and primary winding P2 is wound on leg 72. Primaries P1 and P2 are connected in series, and driven by the switch pairs SW1–SW4, and SW2–SW3. Secondary winding S1 is wound on leg 71 and coupled to primary P1. Secondary winding S2 is wound on leg 72 and coupled to primary P2. Diode D1 rectifies the output of winding S1, and diode D2 rectifies the output of winding S2. The P1 to S1 and P2 to S2 turns ratios are 1:2, just as in FIG. 2. Phasing of the windings is as shown by the phase dots. The diodes D1 and D2 provide current to supply a load via output terminals +Vout and RETURN. Capacitor C1 is connected across +Vout and RETURN, and acts to filter ripple and smooth the output at +Vout. Operation of the embodiment of the invention illustrated in FIG. 7 is exactly the same as for the invention of FIG. 2. The waveforms for the current in S1 and D1 of FIG. 7 is shown in FIG. 4e, and the current in S2 and D2 is shown in FIG. 4f. The output current into C1 is as illustrated in FIG. 4g, and voltage waveforms are as illustrated in FIG. 5a. The essential difference between the embodiments of FIG. 2 and FIG. 7 is resident in the flux paths of the magnetic core. In FIG. 7, primary P1 generates flux in leg 71, and primary P2 generates flux in leg 72. This operation is as follows: when SW1 and SW4 conduct under control of the pulse width modulation control, the phase dot ends of all windings are of positive polarity. D1 is forward biased and provides current to the load. D2 is reverse biased, so flux increases in leg 72, which results in an increase of stored energy. Assuming the converter is in steady state operation and continuous conduction load conditions, the flux in the three legs can be understood with reference to arrows illustrating flux direction in the three legs. When SW1 and SW4 are conducting and the phase dots are positive, flux in leg 71 is in the direction shown by arrow $\Phi A1$. Flux in leg 72 is as shown by arrow $\Phi A2$. Since the input voltage is significantly greater than the regulated output voltage, $\Phi A1$ and $\Phi A2$ will have different magnitudes. The voltage across winding P1 is clamped to less than ½ the input voltage since D1 is forward biased. Therefore, the remainder of the input voltage appears across P2, and this voltage across P2 is substantially greater than across P1. Therefore, arrow $\Phi A1$ is shown shorter than arrow $\Phi A2$. The fluxes shown by arrows $\Phi A1$ and $\Phi A2$ sum and return through center leg 73, as shown by arrow $\Phi A$. On the other switching half cycle, SW2 and SW3 conduct, which causes the phase dot ends of the windings to be of negative polarity. Under these conditions, flux directions reverse. Arrow $\Phi B1$ represents flux direction in leg 71, and arrow $\Phi B2$ shows flux in leg 72. Fluxes $\Phi B1$ and $\Phi B2$ sum and return in center leg 73, as shown by flux arrow $\Phi B$. Since now D2 is forward biased, flux $\Phi B2$ will be changing at a smaller rate than flux $\Phi B1$, so the arrow at $\Phi B2$ is shorter. As a result of the above-described flux conditions, a net DC flux will exist in leg 71, and a net DC flux will exist in leg 72. This flux condition is due to exactly the same volt second per turn situation as described for the operation of the embodiment of FIG. 2; and can be clearly understood when considering the fact that the flux condition in leg 71 of FIG. 7 is exactly the same as the flux condition in T1 of FIG. 2, and the flux condition in leg 73 of FIG. 7 is exactly the same as the flux condition in T2 of FIG. 2. Thus, a DC flux component exists in the magnetic paths of transformer T in FIG. 7. This DC flux is illustrated at arrows $\Phi DC$. Note that the fluxes $\Phi A$ and $\Phi B$ in the center leg 73 are equal and opposite, so no net DC flux exists in leg 73. Therefore, the DC flux which occurs due to the volt-second per turn in legs 71 and 72 exists as a DC component in the outer legs only, and appears in a counter-clockwise direction in T as illustrated by the arrows $\Phi DC$. This allows the core legs 71 and 72 to "return" each others' DC flux, thus simplifying the magnetic structure. Leg 73 is a path for the AC flux component only, and can thus be advantageously constructed without a gap, or of a different ferrite or other material having high permeability. The FIG. 7 converter's pulse width modulation regulation is identical to that of the converter of FIG. 2, and continuous conduction operation is maintained during dead time as flux $\Phi DC$ collapses to forward bias both D1 and D2, releasing stored flux energy as magnetizing current delivered to the load.

In the embodiment of FIG. 7, leg 71 provides the core for containing the flux which couples windings S1 and P1, while leg 72 provides the core for flux coupling S2 and P2. The magnetic circuits for the fluxes in core legs 71 and 72 are both included in leg 73, so leg 73 forms part of the flux path for both cores 71 and 72. In this manner, the effective transformer for the inductive coupling of P1 and S1 consists of legs 71 and 73, while the effective transformer for P2 and S2 consists of legs 72 and 73. Since leg 73 is common to both transformers, an integration of the transformers has been achieved, thus enabling operation of the converter according to the present invention on a readily available 3-leg ferrite E-core.

Figure 8:
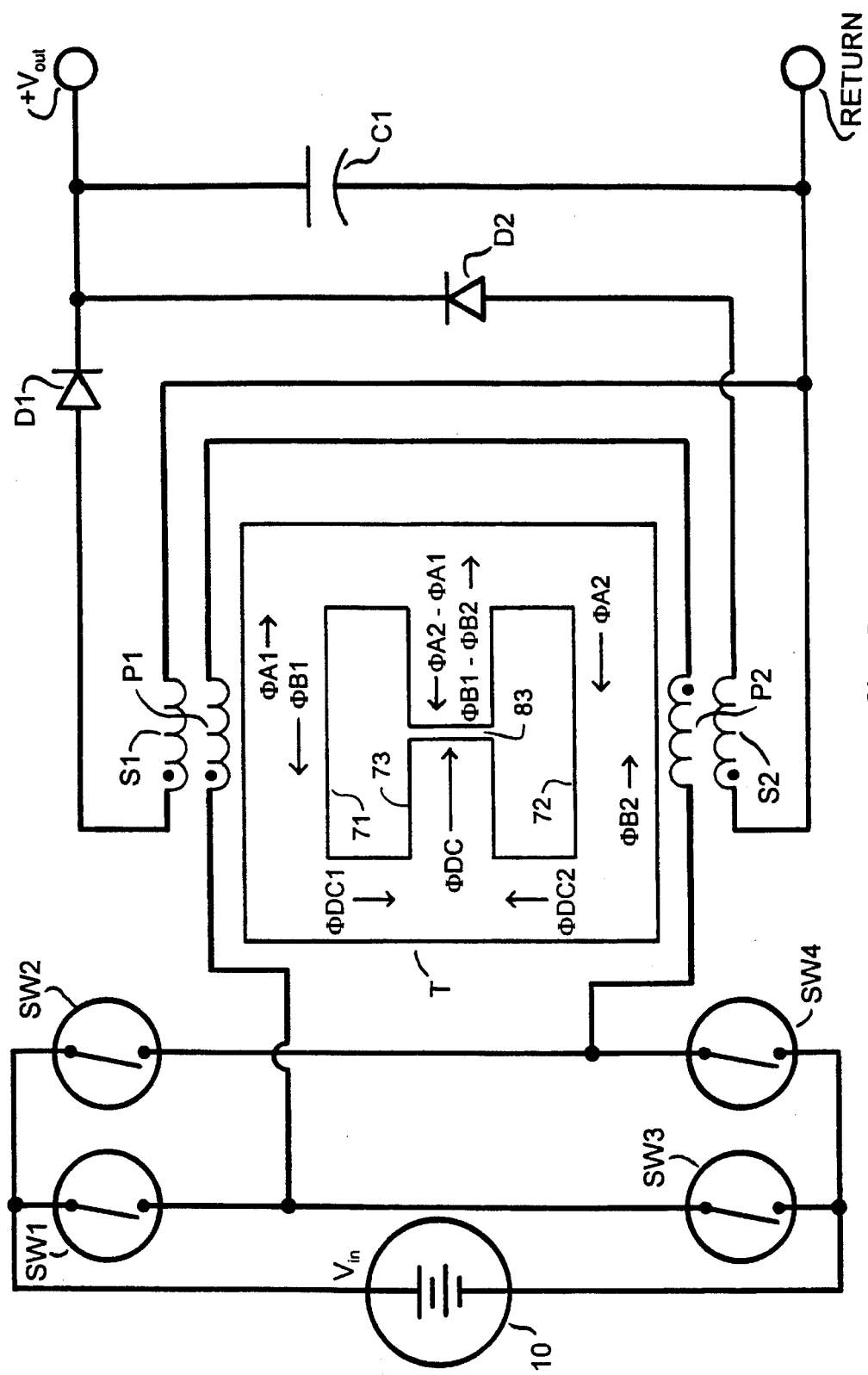
FIG. 8 is a semi-schematic diagram of an alternative embodiment where the invention is implemented in an integrated magnetic E-core structure.

FIG. 8 illustrates an embodiment of the present invention which utilizes an integrated magnetic transformer core. The embodiment of FIG. 8 is very similar to the embodiment of FIG. 7 in operation, but affords different flux paths whereby the center leg is a path for the DC flux component and the outer legs complete the magnetic circuit for the majority of AC flux from both of the magnetic circuits. In the embodiment of FIG. 8, Transformer T has a ferrite core with legs 71, 72, and 73. Leg 73 has a gap as indicated at 83. The characteristics of gap 83 are determined to be such that at least a sufficient amount of energy is stored to effect continuous conduction conditions. A voltage source 10 provides input voltage to the switches SW1 through SW4. Windings P1, P2, S1, and S2 are just as for the embodiment of FIG. 7, and have the same turns ratios. Diodes D1 and D2 rectify windings S1 and S2 respectively, to provide regulated power to a load connected to terminals +Vout and RETURN. Just as for FIGS. 2 and 7, the description of operation will assume steady state conditions of continuous output current.

When the SW1–SW4 pair conduct, D1 is forward biased and D2 reverse biased. Flux in leg 71 under these conditions is represented by arrow $\Phi A1$, and in leg 72 by arrow $\Phi A2$. Flux $\Phi A2$ will have a greater rate of change than flux $\Phi A1$, which is shown by a longer arrow for $\Phi A2$. The center leg 73 will provide a path for the difference in flux, $\Phi A2-\Phi A1$, as shown by the arrow $\Phi A2-\Phi A1$ in the leg 73. For the phase when SW2 and SW3 conduct, leg 71 will have flux conditions shown by arrow $\Phi B1$ and the flux in leg 72 will be as shown by arrow $\Phi B2$. The rate of change of flux in leg 71 will be greater than in leg 72, so arrow $\Phi B1$ is longer than arrow $\Phi B2$. A DC flux component will exist in leg 71 as shown by arrow $\Phi DC1$. A DC flux component will exist in leg 72 as shown by arrow $\Phi DC2$. As can be seen from the arrows, the DC flux components sum in center leg 73 as shown at arrow $\Phi DC$. The center leg 73 thus acts as a path for the transformer DC flux component, and conducts the sum of the DC fluxes of the outer legs. However, center leg 73 only conducts the difference of the AC fluxes of the outer legs 71 and 72, and thus has only a small AC component. Functionally, the magnetic circuit composed of leg 71 including the flux return path through leg 73 behaves magnetically just as the magnetic circuit for transformer T1 of FIG. 2. The magnetic circuit of leg 72 including the return path through leg 73 behaves magnetically just as the magnetic circuit for transformer T2 of FIG. 2. Thus, when the phase dots are positive, the reluctance of the path through leg 72 is determined principally by the gap 83 for storage of energy, and the reluctance of the path through leg 71 is determined principally by the gap 83 for release of energy. Thus a single gap in leg 73 serves to store and release energy for both phases of converter operation. This results in a simpler magnetic component. As for the converter of FIG. 2, current is provided to the load through a forward biased rectifier during switch conduction times, and the collapsing flux field ODC forward biases both rectifiers during the dead time to sustain continuous conduction operation. It should be noted that the description of operation and waveforms for the embodiments of FIGS. 7 and 8 are substantially the same as those given in reference to the embodiment of FIG. 2.

In the magnetic path integrations of FIGS. 7 and 8, the outer legs function as cores of the separate transformers of FIG. 2, for coupling P1 with S1 and P2 with S2, while the center leg of FIGS. 7 and 8 serves as a common path for returning the fluxes of the outer legs. Further, the description in reference to the embodiment of FIG. 8 becomes still simpler when it is recognized that the constructional difference between the embodiments of FIGS. 7 and 8 lies essentially only in reversing the direction of the AC flux in leg 72, and placing the energy storage gap in the part of the circuit where there is the DC flux component. In the embodiment of FIG. 7, the gaps are preferably placed in the legs having the secondary windings. However, in the embodiment of FIG. 8, the gap can be in the center leg as shown, or, alternately, gaps can be placed in the legs with the secondary windings as shown in FIG. 7. Further, the embodiment of FIG. 8 operates quite advantageously with gaps in all three legs, and can effectively utilize the common technique of achieving equal gaps in all three legs of a ferrite E-core by placing spacers in the outer legs between assembled E-core halves.

Figure 9:
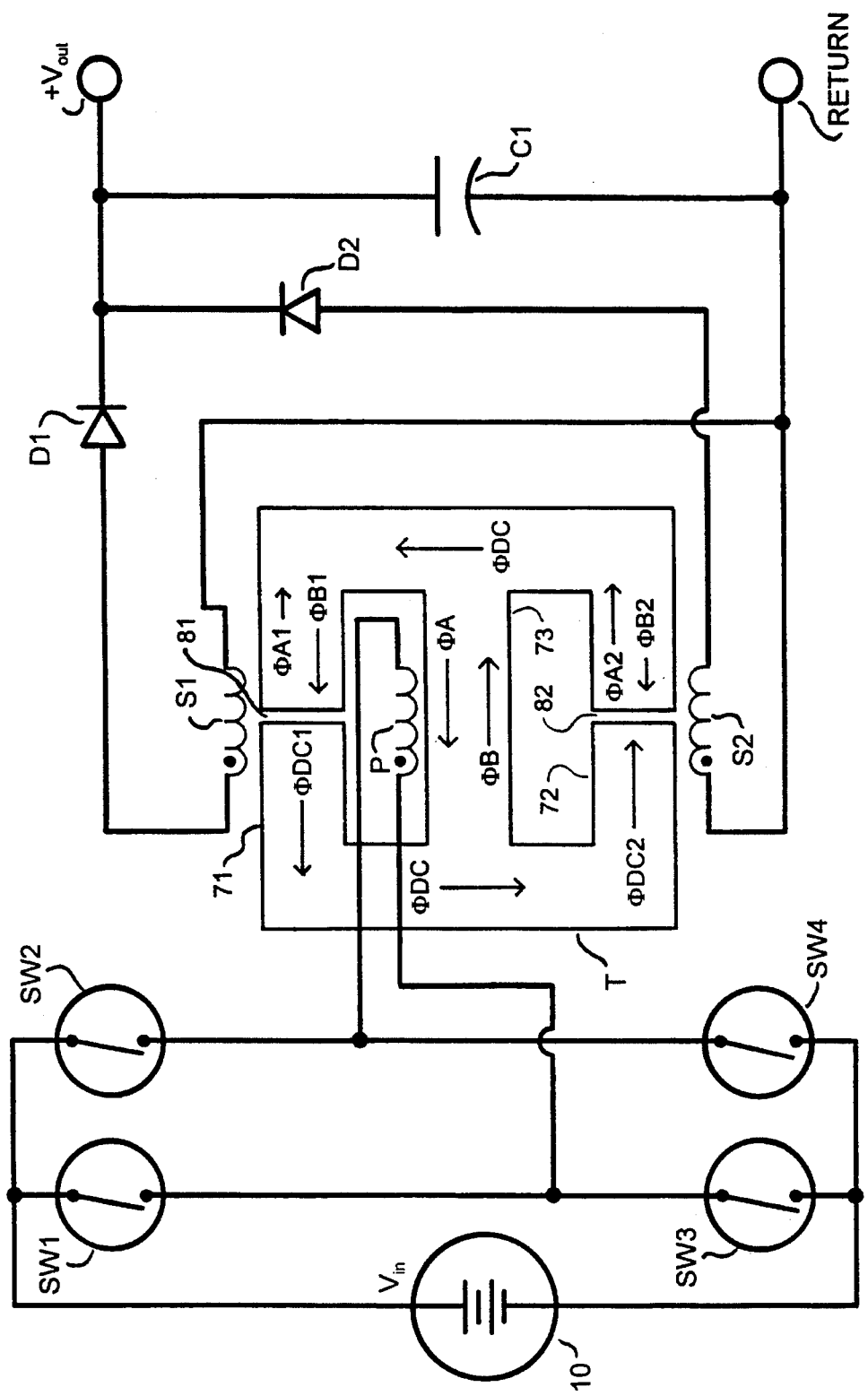
FIG. 9 is a semi-schematic diagram of an alternative integrated magnetic implementation of the invention where the primary and secondary windings are on separate legs.

FIG. 9 illustrates an embodiment of the present invention in which a still further integration of transformer operation is achieved. In FIG. 9, a voltage source shown at 10 provides input voltage to a full bridge consisting of switch pairs SW1–SW4, and SW2–SW3. A transformer, generally indicated at T, has ferrite legs 71, 72, and 73. Secondary winding S1 is wound on leg 71, and secondary winding S2 is wound on leg 72. A primary winding P is wound on the center leg 73. Leg 71 has a gap 81, and leg 72 has gap 82. Gaps 81 and 82 are sized such that an amount of energy is stored sufficient to allow continuous conduction operation of the converter, so that during the dead time there is current delivered to the load. The center leg 73 is preferably not gapped. The turns ratio between primary and secondary is 1:2 between P and S1, and 1:2 between P and S2. Diode D1 rectifies winding S1, and diode D2 rectifies winding S2. Output current from the secondary windings is delivered to a load through output terminals +Vout and RETURN. Capacitor C1 is connected for filtering AC and smoothing current to the load. Winding polarities are as shown by the phase dots. Conditions of operation of the embodiment of FIG. 9 are substantially the same as for the embodiments of FIGS. 2, 7, and 8; that is, input voltage is greater than output voltage, and the description will assume steady state operation with continuous conduction conditions in the transformer. The converter of the present invention illustrated in FIG. 9 operates electrically the same as the converters illustrated and described with reference to FIGS. 2, 7, and 8. All waveforms for primary and secondary currents with respect to equivalent components are identical, as illustrated in FIGS. 4. Magnetically, however, the flux paths which couple the windings of the converter of FIG. 9 offer further advantages of construction, and merit further expanation. In FIG. 9, when the SW1–SW4 pair conduct the dot ends of the windings are of positive polarity. The primary winding P causes a flux to be induced in center leg 73 as shown by the arrow ΦA. This flux divides to pass through the outer legs 71 and 72. Diode D1 is forward biased, so the flux rate of change in leg 71 is clamped and limited by the reflected regulated output voltage. The remainder of the flux, then, must be conducted through leg 72, which is possible since diode D2 is reverse biased and there is no clamping. The input voltage is at least equal to but preferably greater than the output voltage, so the primary P impresses a flux rate in leg 73 representing this input voltage. However, the flux from leg 73 divides between legs 71 and 72, so the volts per turn in leg 71 or 72 may be only half the primary. Nonetheless, since the turns ratio from primary P to either secondary is 1:2, sufficient voltage can be induced on either primary to forward bias an output rectifier and provide current to a regulated output having a voltage of slightly less than the input voltage. Since the conducting rectifier clamps the rate of flux change in the conducting leg, and the input voltage is higher than the output voltage, the rate of change in the non-conducting leg will be greater than in the conducting leg. Thus, when switches SW1 and SW4 are conducting, D1 is forward biased. The total flux ΦA from leg 73 divides, and the flux in leg 71 is represented in direction and magnitude by arrow ΦA1. The remainder of the divided ΦA flux flows in leg 72, and is represented in direction and magnitude by arrow ΦA2. Arrow ΦA2 is longer than arrow ΦA1 since D1 clamps the rate of change of flux in leg 71 to less than ½ the total of ΦA. On the other half cycle when switch pair SW2–SW3 conducts, flux in leg 73 reverses as indicated by arrow ΦB. The ΦB flux divides to generate flux in leg 71 as indicated by arrow ΦB1, and flux in leg 72 as indicated by arrow ΦB2. Diode D2 is forward biased and clamps the rate of change of flux ΦB2 to a smaller value than that of flux ΦB1. For steady state operation, fluxes ΦA and ΦB are equal and opposite, so no net DC flux is present in primary leg 73. However, a net DC flux is generated in leg 71, and is illustrated by flux arrow ΦDC1. Also, a net DC flux is generated in leg 72, as indicated by arrow ΦDC2. As a result, a net DC flux exists in transformer T, and circulates in a counterclockwise direction as indicated by flux arrow ΦDC. The gaps 81 and 82 are placed in the magnetic path where this DC flux is present. Leg 73 is preferably not gapped. Apart from the differences in winding location, the embodiment of the invention illustrated in FIG. 9 operates electrically the same as for the embodiments illustrated in FIGS. 2, 7, and 8. Operating waveforms for equivalent components are as illustrated in FIGS. 4.

Magnetically, the embodiment illustrated in FIG. 9 takes advantage of the mutual magnetic circuit leg 73 to provide further advantageous operation of the invention. In FIG. 9, primary winding P is coupled to secondary winding S1 by flux in core leg 71 which has its magnetic circuit completed through leg 73, in which the flux is controlled by winding P. Similarly, winding P is coupled to S2 by flux in core leg 72 which also has its magnetic circuit completed through 73, where the flux is controlled by winding P. Thus, the fluxes in cores 71 and 72 are both controlled by winding P since winding P has simultaneous control over flux in both magnetic circuits. Thus, the single winding P is actually the functional equivalent of the series connections of P1 and P2 such as described for FIG. 2. This affords a simpler construction, avoiding splitting the primary winding into a series connection of two separate transformer primaries. Also, the required number of turns of the primary P is reduced by a factor of 2:1 as compared to other P1–P2 split-primary embodiments regulating the same output voltage from the same input voltage.

Figure 10:
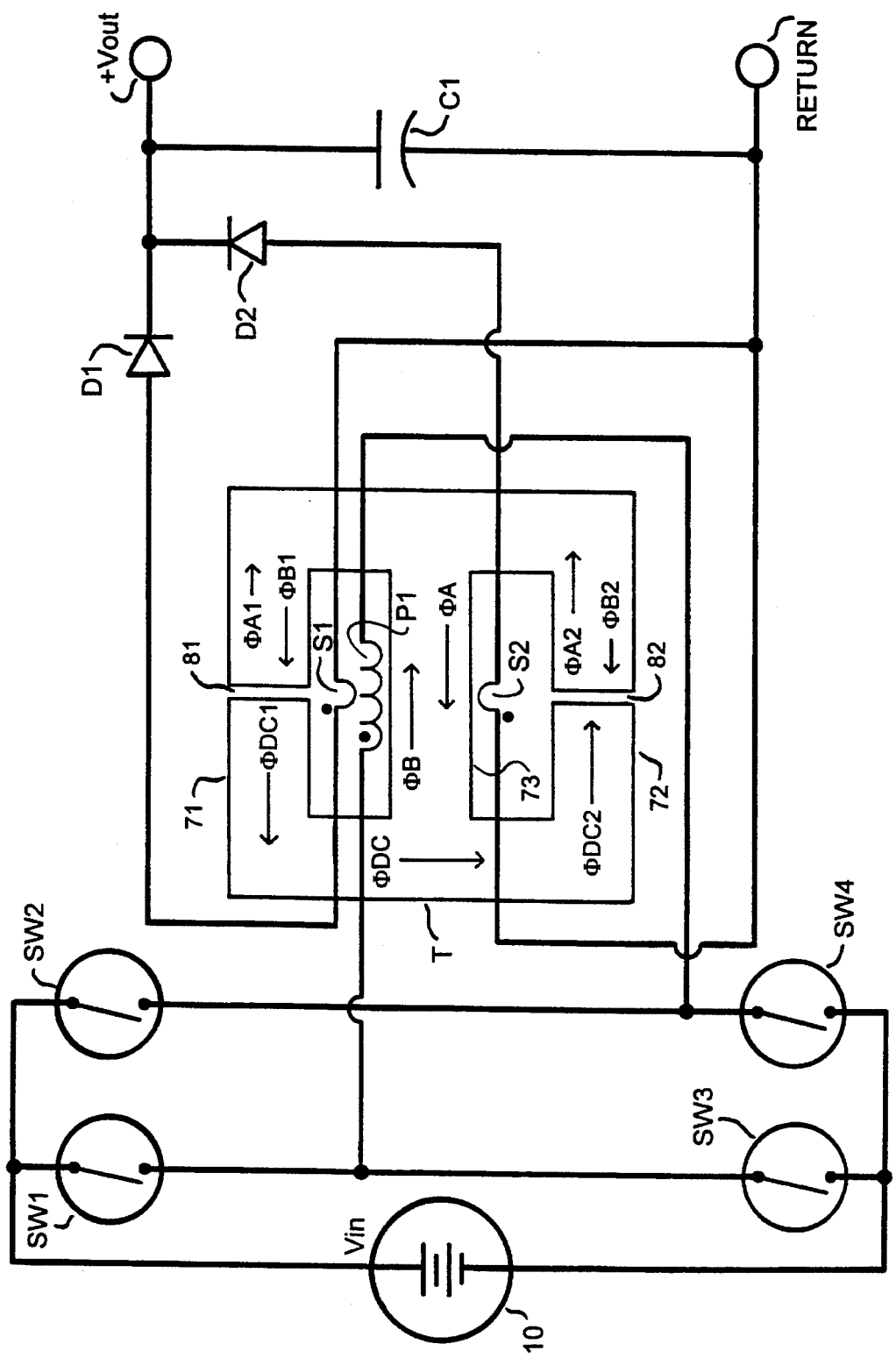
FIG. 10 is a semi-schematic diagram of an integrated magnetic implementation wherein half-turn secondaries and the primary are all wound on the center leg of a 3-leg core assembly.

In FIG. 10 is illustrated an especially advantageous embodiment of the present invention in which integration of transformer and output filter functions, as well as magnetic flux path integration, is achieved with transformer windings on only a single leg of a multi-leg magnetic component. In the embodiment of FIG. 10, a voltage source 10 provides input voltage to a full-bridge connected primary having switches SW1, SW2, SW3, and SW4. The source 10 of Vin supplies an input voltage to the converter that is equal to or greater than 2 times the output voltage. The switches are operated in pairs in response to a pulse width modulator to achieve full bridge operation. A ferrite core transformer, generally indicated at T, has legs 71, 72, and 73. A gap 81 is placed in leg 71, and a gap 82 is placed in leg 72. The gaps 81 and 82 are size such that at least a minimum amount of energy is stored as flux so that output current to the load can be maintained during the primary dead times. Secondary winding S1, which is implemented as a half-turn, is wound on center leg 73 through the core opening between legs 73 and 71. Secondary winding S2, also implemented as a half-turn, is wound on center leg 73 through the core opening between legs 73 and 72. The primary winding P is implemented as a single turn around center leg 73. Phasing of the windings is as indicated by the phase dots. It should be kept in mind that, in an E-core structure, what is constructionally a half turn around the center leg is constructionally equivalent to one whole turn around either of the outer legs. Diode D1 rectifies the output of winding S1, and diode D2 rectifies the output of winding S2. Current delivered through D1 and D2 is provided to a load, which is connected to the converter across output terminals +Vout and RETURN. Capacitor C1 is connected across the output terminals to act as a voltage sink/source for smoothing output ripple. The switch pairs are operated in a full wave full bridge manner by a conventional pulse width modulation controller which is sensitive to the output voltage for changing the switch duty cycle to maintain output regulation. Operation of the embodiment of the invention illustrated in FIG. 10 is identical to the operation of the embodiment illustrated in FIG. 9, taking into account that the input voltage from source 10 in FIG. 10 is double the source voltage from source 10 in FIG. 9. In the embodiment of FIG. 10, conduction of the switch pair SW1–SW4 causes the dot end of all windings to have a positive polarity. D1 becomes forward biased, and D2 is reverse biased. The input voltage appears across the single turn of the primary winding, causing a flux change in leg 73 having a direction and magnitude represented by arrow $\Phi A$. The flux $\Phi A$ will tend to divide to complete the magnetic circuit, part to return through leg 71 and part through leg 72. The rate of change of flux through leg 71 will be clamped to a value less than ½ the volts per turn of leg 73, since rectifier D1 is conducting. This flux condition in leg 71 is illustrated by arrow $\Phi A1$. The remainder of the $\Phi A$ flux will pass through the leg 72. The rate of change of flux in leg 72 is illustrated by arrow $\Phi A2$, and is shown greater than that of $\Phi A1$ since the volts per turn in the primary is more than double the volts per turn of the leg that is clamped by the conducting secondary. When the switches SW2 and SW3 conduct to complete the other half-cycle of the primary, the dotted ends of the windings have a negative polarity. Now, D2 is forward biased and D1 is reverse biased. A flux in primary leg 73 is shown by arrow $\Phi B$, and is of equal magnitude but opposite direction as arrow $\Phi A$. The flux $\Phi B$ divides to return through legs 71 and 72. The flux in leg 72 is illustrated by arrow $\Phi B2$, and is shown as a short arrow since the rate of change of flux in leg 72 is clamped due to conduction of D2. The flux in leg 71 is illustrated by arrow $\Phi B1$, and represents a flux change greater than that shown by arrow $\Phi B2$. Thus, a net DC flux will exist in leg 71, as illustrated by arrow $\Phi DC1$, and a net DC flux will exist in leg 72, as illustrated by arrow $\Phi DC2$. This causes an overall net DC flux to exist in the transformer T, circulating counter-clockwise as shown by arrow $\Phi DC$. During the dead times of the primary switches, the fluxes $\Phi DC1$ and $\Phi DC2$ collapse and forward bias the rectifiers of their respectively associated secondary windings, thus providing current to the load to sustain continuous conduction operation. Thus, it can be seen that the operation of the embodiment of the invention of FIG. 10 operates according to the same principles operation of the embodiments of FIGS. 2, 7, 8, and 9. The current waveforms for equivalent components of FIG. 10 are as illustrated in FIG. 4. The embodiment of the invention shown in FIG. 10 requires a higher minimum input voltage than previously described embodiments. This constraint is due to the fact that a primary winding of less than a single turn essentially defeats the operation of the invention if the secondaries are effectively implemented as half-turns on the same leg as the primary. Because of the principle of operation where the minimum input voltage for regulation is equal to at least twice the regulated output voltage reflected to the primary winding, and since the output from the single turn primary is halved due to the split flux paths when presented to the secondary windings, an input voltage at least double the output voltage is required for this embodiment. In general, higher input voltages could be utilized optimally by increasing the number of primary winding turns.

From a magnetic standpoint, the embodiment illustrated in FIG. 10 operates magnetically identically to the embodiment illustrated in FIG. 9. The difference between the embodiments relates simply to moving what would be a single turn secondary on the legs 71 and 72 of FIG. 9 to center leg 73 as half-turns. The flux relationships and operating principles remain as for previously described embodiments.

Another feature of the instant invention is the suitability for use with advanced magnetic structures such as that of the Matrix Transformer, as taught in U.S. Pat. No. 4,665,357 to Herbert. In the Matrix Transformer construction, matrices of multiple transformers are employed to achieve advantageous circuit operation. The most usual implementations involve series connection of multiple and often identical transformers to subdivide turns ratios. For instance, a full bridge Buck-derived conventional DC to DC converter can be implemented with matrix transformers by a multiplicity of transformers with series connected primaries and full wave rectifying secondaries. The transformed output voltages are smoothed by filter inductors which may also be implemented as a matrix of multiple elements.

Figure 11:
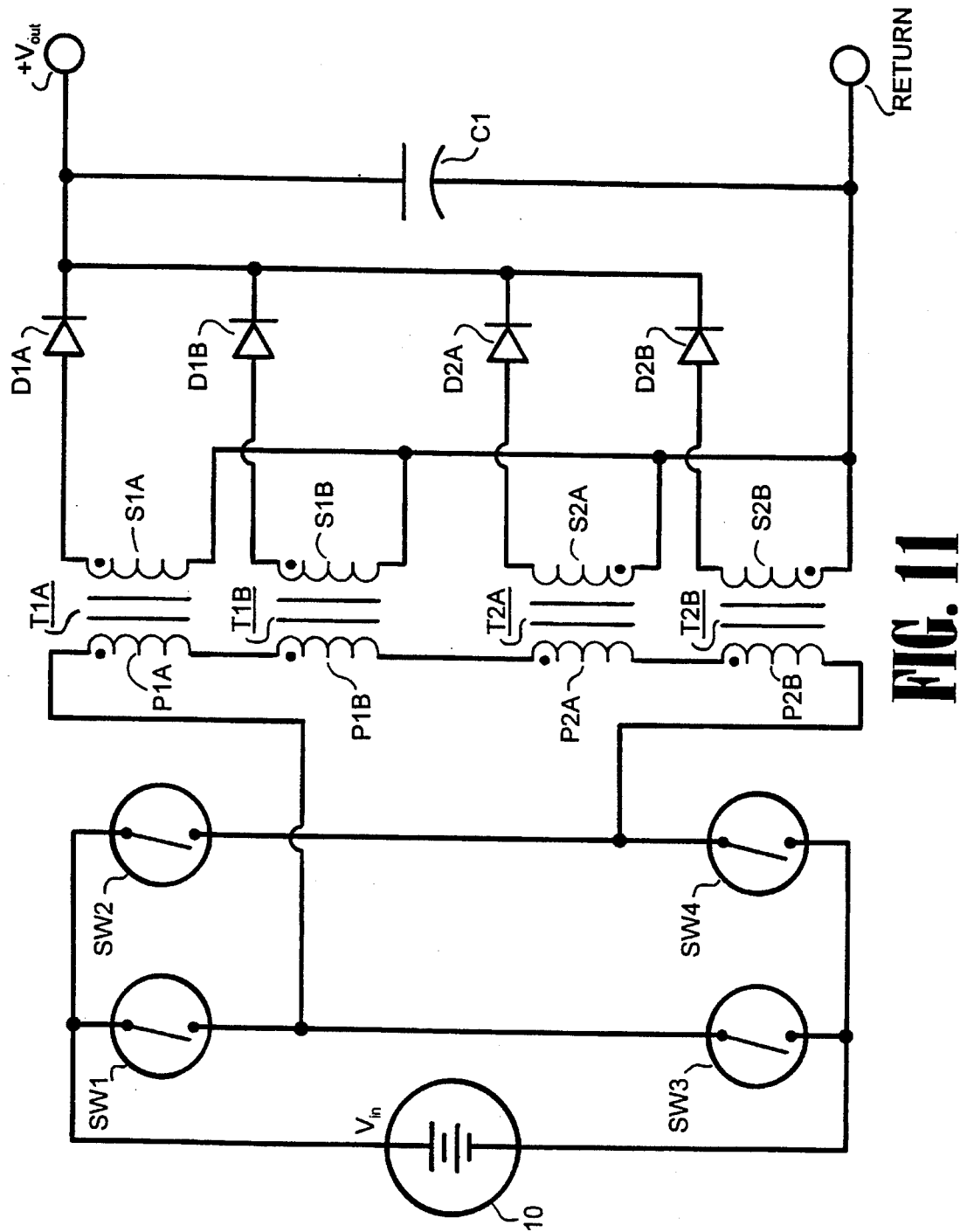
FIG. 11 is an embodiment of the invention where the magnetic structure is according to Matrix Transformer construction.

Consider that the present invention operates in a full wave manner to achieve integration of magnetic functions, but to do so requires a minimum of two transformers, which may be implemented as two discrete transformers. These two transformers may be nearly identical in construction, differing only in the phasing between input and output windings. However, a Matrixed multiplicity of transformers is a natural extension of the fundamental transformer requirement, and affords especial advances in simplicity since no additional discrete inductors need to be added. Phasing differences to enable operation of transformers required for the present invention can be easily implemented by a technique as simple as reversing lead terminations when soldering into a circuit board, imparting an important funtional difference to otherwise constructionally identical components. Thus, an array of virtually identical transformer elements can be utilized according to Matrix Transformer technology to implement the instant invention very advantageously. FIG. 11 illustrates a simple single output embodiment of the invention utilizing a matrix of 4 transformers consisting of two pairs of two elements, operating out of phase. Voltage source 10 provides an input voltage greater than or equal to 4 times the output voltage. The switch pairs SW1–SW4 and SW2–SW3 are full wave operated to achieve full bridge function. Transformers T1A, T1B, T2A, and T2B have primary windings P1A, P1B, P2A, and P2B respectively, and secondary windings S1A, S1B, S2A, and S2B respectively. Rectifier diodes D1A, D1B, D2A, and D2B rectify the outputs of secondary windings S1A, S1B, S2A, and S2B respectively. All primary to secondary turns ratios are 1:1. The primary windings of all four transformers are connected in series, and the phases of the windings are as shown by the phase dots. The core material of the transformers is chosen to have appropriately low permeability so that sufficient energy is stored as flux to provide output current during the dead time to support continuous conduction operation. When SW1 and SW4 are conducting, D1A and D1B are forward biased to provide output current to the load as a result of reflected primary winding current and magnetizing current from the cores of T1A and T1B. Energy is stored in the cores of T2A and T2B since rectifiers D2A and D2B are reverse biased. During the conduction times of SW2 and SW3, D2A and D2B conduct current to the load, and the cores of T1A and T1B store energy. During the dead times, all four rectifiers conduct magnetizing current from their respective associated transformer cores to provide continuous current to the load. Principles of operation of the embodiment of FIG. 11 are identical to those principles described previously herein in regard to other embodiments. The currents of D1A and D1B sum to yield the waveform illustrated in FIG. 4e, and the currents of D2A and D2B sum to yield the waveform illustrated in FIG. 4f.

The embodiments illustrated thus far have utilized the full bridge primary switch connection to achieve full wave operation; however, virtually any of the well known full wave primary circuits can be employed to operate the various embodiments of converters according to the present invention. For example, the half bridge can be utilized in the converter of FIG. 2 by merely substituting capacitors of the appropriate value for SW2 and SW4, decreasing the number of primary turns by a 2:1 ratio as compared to the full bridge, and modifying the control circuit so that SW1 and SW3 are operated alternately to achieve full wave operation. For the embodiment of FIG. 10, use of a half bridge primary would require doubling the voltage of voltage source 10, since the primary should not be less than one turn.

Figure 12:
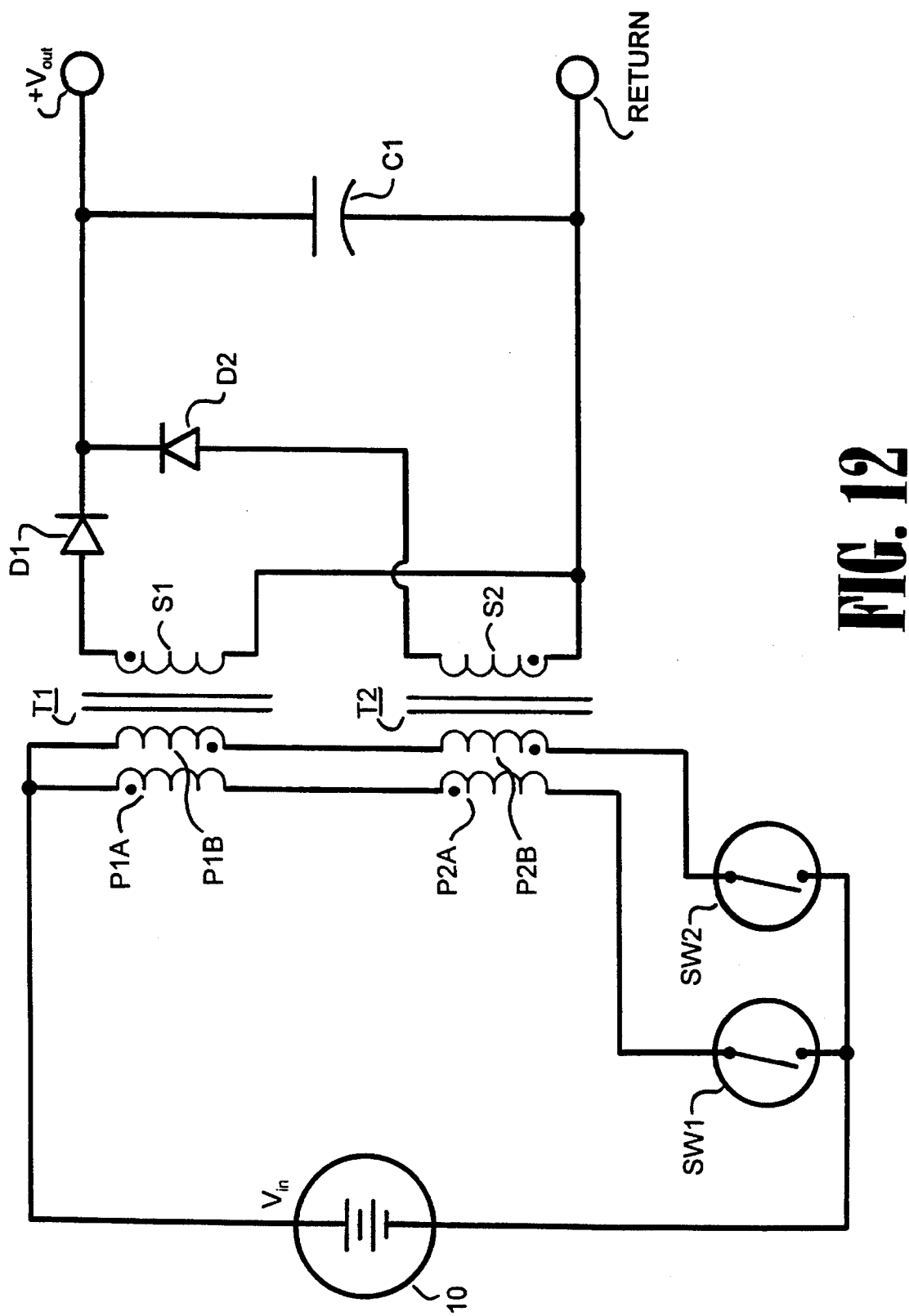
FIG. 12 illustrates the primary winding configuration as implemented with a push-pull inverter circuit.

FIG. 12 illustrates a push-pull primary as applied to an embodiment which is otherwise identical to the embodiment of FIG. 2. Transformer T1 has primary windings P1A and P1B. Transformer t2 has primary windings P2A and P2B. Primaries P1A and P2A are connected in series, while P1B and P2B are series connected. Phases of windings are as shown by the phase dots. Switches SW1 and SW2 are closed on alternate half cycles of converter operation under control of a pulse width modulating circuit which is responsive to an error amplifier that senses the output voltage. All four primary windings have the same number of turns; both secondaries have equal turns; and the turns ratio of any primary to any secondary is 1:2 if the input voltage is equal to or greater than the output voltage. Primary current waveforms and output rectifier waveforms are as illustrated in FIG. 4.

Figure 13:
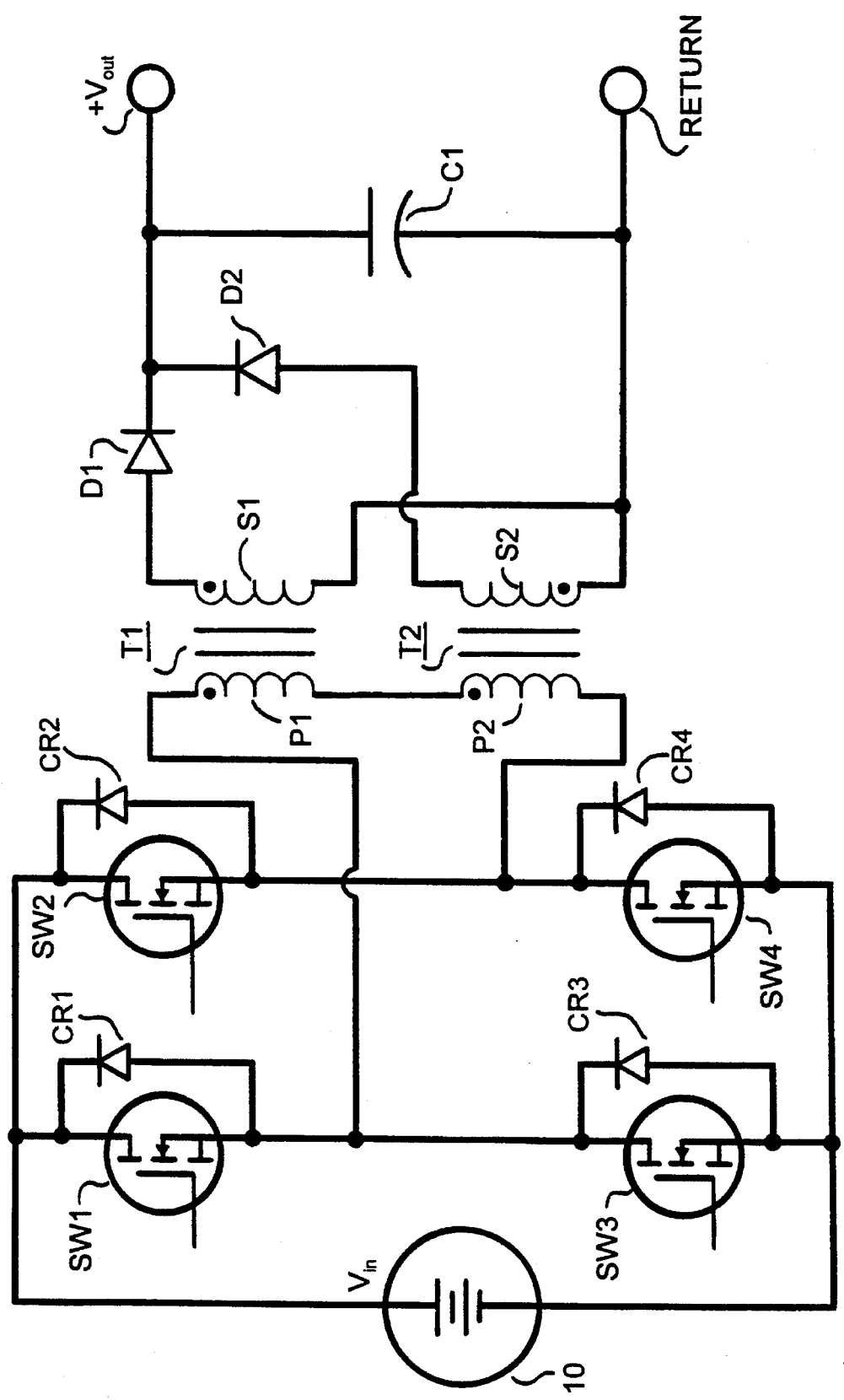
FIG. 13 illustrates an embodiment of the invention employing a full-bridge inverter primary where zero voltage switching is implemented by short circuiting the primary during dead times.
Figure 14A:
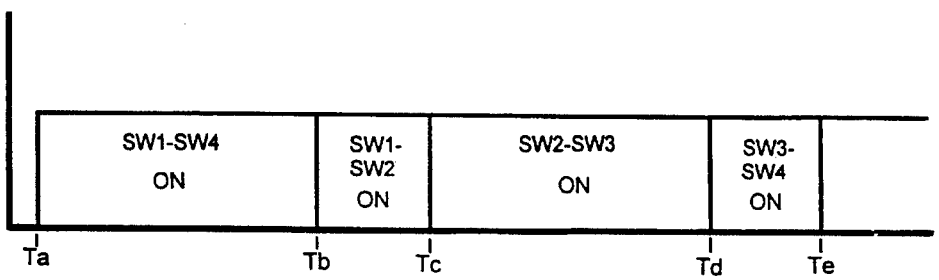
FIG. 14 illustrates timing relationships and current waveforms in the primary and secondary windings for an embodiment of the invention employing zero voltage switching of a full bridge primary circuit.
Figure 14B:
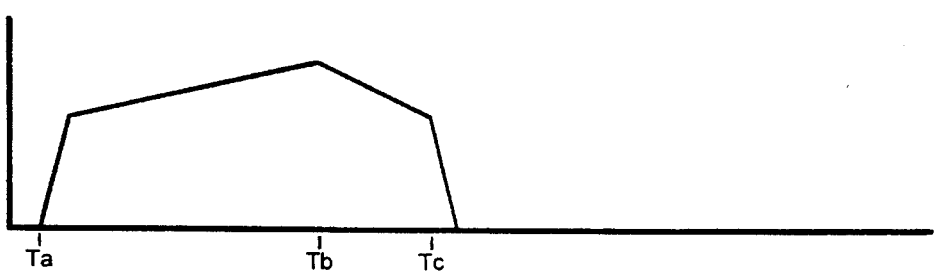
Figure 14C:
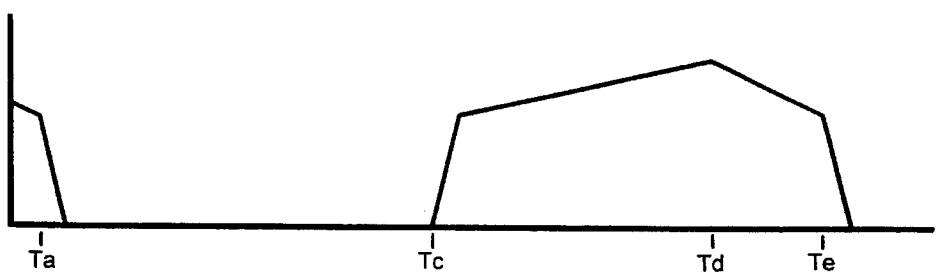
Figure 14D:
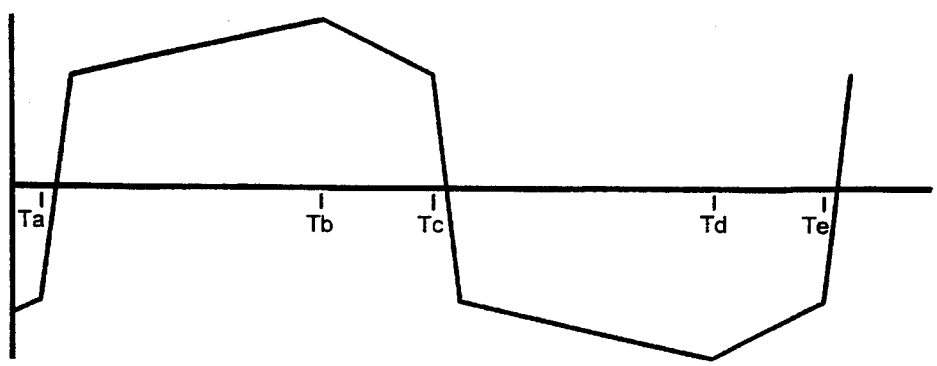

For the foregoing embodiments of the invention, the description has been given with reference to operating the primary with a pulse width modulated inverter which effects opening of the primary circuit during the dead time between width modulated pulses. However, the converter also operates advantageously with an inverter which effects dead time by disconnecting the input voltage source and effecting a short circuit across the primary. FIG. 13 illustrates a converter according to the present invention in which this inverter control method is implemented, say, by an inverter such as the one taught in U.S. Pat. No. 4,864,479 to Steigerwald et al. In the converter of FIG. 13, an input voltage source 10 provides input voltage to the converter. MOSFET switches SW1, SW2, SW3, and SW4 are connected in a full bridge inverter configuration, and controlled by the control means such that switches SW1 and SW3 conduct alternately for an essentially 50% duty cycle, and SW2 and SW4 conduct alternately for essentially a 50% duty cycle. Pulse width and dead time are controlled by adjusting the operating phase between the switch pairs SW1–SW3, and SW2–SW4, in a manner according to that taught in the Steigerwald et al. patent. Transformer T1 has primary transformer winding P1, and transformer T2 has primary winding P2. Windings P1 and P2 are connected in series to form a converter primary which is connected across the inverter formed by the MOSFET switches. Antiparallel diodes CR1, CR2, CR3, and CR4 are connected across switches SW1, SW2, SW3, and SW4, respectively. The MOSFETs may possess parasitic capacitances in parallel, or discrete capacitance may be connected across the switches to achieve the capacitance circuit function taught in the Steigerwald et al. patent. During the effected dead time, a short circuit exists across the series connection of P1 and P2. Secondary windings S1 and S2 are wound on T1 and T2 respectively, and rectified by D1 and D2 respectively, as for the embodiment of FIG. 2. Phasing of the windings is as shown by the phase dots. Current flowing to the load from the secondaries is filtered by capacitor C1. FIG. 14d illustrates the current flowing in series connected primaries P1 and P2 of the embodiment of FIG. 13. FIG. 14b illustrates current flow in D1. FIG. 14c illustrates current flow in D2. FIG. 14a illustrates the timing relationships of the switch pairs. Referring to FIGS. 13 and 14, when the primary is energized so that the phase dot ends of the windings are positive, as shown between times Ta and Tb of FIG. 14, D1 becomes forward biased and simultaneously flows current induced from P1 and induced by collapsing T1 flux. FIG. 14b illustrates this current. At time Tb, the inverter short circuits the primary winding between times Tb and Tc. During this time, transformer leakage inductance in series with the primary winding P1 causes primary current to continue flowing, as shown in FIG. 14a between times Tb and Tc. This current continues to support the magnetizing flux of T2, so no current flows in D2 between Tb and Tc. Instead, energy from collapsing flux in T2 causes a voltage across P2 which drives winding P2. In this manner, energy from T2 is delivered to T1 through P1, and D1 continues to flow output current, although with a decreasing slope, as shown in FIG. 14a between times Tb and Tc. When the inverter reverses phase, as shown in FIG. 14 between times Tc and Td, primary switch current flows in the opposite direction. Rectifier D2 now becomes forward biased and S2 flows current due to induction from P2 and magnetizing current from collapsing flux in T2. This D2 current is as illustrated in FIG. 14c between times Td and Td. During the subsequent dead time, as shown between times Td and Te, the inverter short circuits the primary connection, and magnetizing energy from T1 supports a continuation of S2 current flow, as illustrated in FIG. 14c between times Td and Te.

For many of the embodiments of the Figures illustrated herein, the primary switching elements have been illustrated schematically. However, the switches can advantageously be implemented in practical converters utilizing MOSFET transistors, as illustrated in FIG. 13, or BIPOLAR transistors. In practical bridge implementations, the switching elements should be bypassed by antiparallel diodes to return energy stored in the leakage inductance to the input voltage source for minimization of losses and reduction of stress on the switches. MOSFET transistors often have inherent antiparallel diodes which are suitable for this purpose, and therefore MOSFETs make excellent switching elements for the converter. FIG. 13 illustrates the use of MOSFETs bypassed by antiparallel diodes.

Although, for the sake of simplicity of discussion, the input voltage to the converter embodiments described herein was equal or close to the output voltage, it is anticipated that many practical applications will require the converter to operate from input voltages much higher than (or much different from) the output voltage. This is easily accomplished by scaling the primary to secondary turns ratio(s) in view of the principle that the converter can be made to regulate in response to pulse width modulation as long as the input voltage is sufficiently high so that the primary circuit current can increase when the primary input voltage is impressed across the primary winding during switch conduction. From a practical standpoint, this is best achieved when the input voltage is greater than 2 times the output voltage as reflected to the primary winding.

The invention herein has been described in terms of its direct function as a DC to DC electrical converter. However, it is extremely well suited for use in off-line AC to DC power conversion by suitable use of a rectifier circuit for first converting input AC to raw DC, and using the raw DC as input to the instant converter. This will be recognized by those skilled in the art as a very common circuit technique for employing virtually any DC to DC converter in off-line applications.

Many other virtues and advantages of the converter according to the present invention can be seen by one skilled in the art, upon examination of what is taught herein. For instance, since the magnetizing energy of the transformers is delivered to the output, there is no need to minimize the magnetizing current, as is the common practice with the Buck-derived converters where magnetizing current must be recirculated with minimum loss. In fact, the transformers of the various embodiments of the present invention can advantageously utilize air cores, particularly at higher operating frequencies. This yields further advantages of lower cost, lighter weight, and reduced losses.

For instance, the embodiment of FIG. 2 could relatively easily be implemented with air cores for transformers T1 and T2. Referring to the embodiment illustrated in FIG. 8, the center leg 73, which is illustrated as an air gapped ferrite leg, conducts converter DC flux, with a smaller component of AC flux. This leg could easily be constructed with an air flux path instead of an actual ferrite leg. This would result in the magnetic element of FIG. 8 being realized by an ungapped U-core of ferrite, with air surrounding the U-core functioning as a virtual third leg 73. With air instead of ferrite for leg 73, the flux from legs 71 and 72 actually returns through the air surrounding the physical U-core magnetic assembly.

Some integrated magnetic embodiments of the invention, such as those of FIGS. 7, 8, and 10, have legs without windings. These legs are structural members for accomplishing completion of flux circuits. Those skilled in the art will recognize that these flux circuits could also be completed by alternate, multiple or split return paths, such as could be accomplished on 4-leg cores or the above-mentioned U-core, and the use of 3-leg cores is not limiting, but merely exemplary of advantageous constructions utilizing commercially available magnetic cores.

An additional benefit results from the characteristic of the invention where the flux levels on alternate half cycles are essentially individually controllable. This facilitates the use of primary side peak-sensing current mode control in the half-bridge configuration. To balance the capacitive bridge, the magnetizing current on one half cycle can be deliberately made different from the magnetizing current on the other half cycle to provide a current difference which allows balancing an unbalanced bridge.

The operating characteristic of the invention where one of the two transformers in series in the primary circuit acts as a series inductor to limit the rate of rise of primary current gives the converter the characteristics and advantages of a current-fed converter, affording additional protection against output fault conditions.

The present invention, with its inherent features and advantages, has been herein described with respect to various preferred embodiments. Nonetheless, other variations and implementations will be apparent to those skilled in the art, without departing from the scope of the invention. Accordingly, it is intended that the foregoing descriptions be exemplary in nature, and that such variations, changes, and modifications as will be apparent to those skilled in the art be included within the scope of the appended claims.

What is claimed is:

1. A full wave DC to DC power converter having magnetically integrated transformer and output filter functions for supplying power to a load, comprising:

an input voltage source for supplying DC input voltage;

a transformer primary winding means;

inverter means adapted to periodically connect said input voltage source alternately across said primary winding means for a first half-cycle of one polarity and a second half-cycle of an opposite polarity;

a first transformer secondary winding connected in series with a first rectifier means to form a first output circuit;

a second transformer secondary winding connected in series with a second rectifier means to form a second output circuit;

said first secondary winding being inductively coupled to said primary winding means by a first magnetic flux which has stored energy such that during said first half-cycle said first output circuit simultaneously conducts current that is a sum of current induced by said primary winding means and magnetizing current induced from said first magnetic flux;

said second secondary winding being inductively coupled to said primary winding means by a second magnetic flux which has stored energy such that during said second half-cycle said second output circuit simultaneously conducts current that is a sum of current induced by said primary winding means and magnetizing current induced from said second magnetic flux;

during said first half-cycle said stored energy in said first magnetic flux decreases while simultaneously said stored energy in said second magnetic flux increases, and during said second half-cycle said stored energy in said first magnetic flux increases while simultaneously said stored energy in said second magnetic flux decreases; and, wherein said first magnetic flux and said second magnetic flux exist within a three leg E-core having first, second, and third legs, where said primary winding means is wound on the first leg, said first secondary winding is wound on the second leg, and said second secondary winding is wound on the third leg.

2. The converter according to claim 1 wherein said primary winding means consists of a series connection of a first primary winding which is coupled by said first magnetic flux to said first secondary winding, and a second primary winding which is coupled by said second magnetic flux to said second secondary winding.

3. The converter according to claim 2 wherein:

said first magnetic flux substantially couples only said first secondary winding to said first primary winding; and said second magnetic flux substantially couples only said second secondary winding to said second primary winding.

4. The converter according to claim 1 wherein:

said first and second half-cycles have an intermediary dead time such that said input voltage is disconnected from said primary winding during said dead time; and said first and second output circuits simultaneously flow current to said load during said dead time.

5. A full wave DC to DC power converter having magnetically integrated transformer and output filter functions for supplying power to a load, comprising:

an input voltage source for supplying DC input voltage;

a transformer primary winding means;

inverter means adapted to periodically connect said input voltage source alternately across said primary winding means for a first half-cycle of one polarity and a second half-cycle of an opposite polarity;

a first transformer secondary winding connected in series with a first rectifier means to form a first output circuit;

a second transformer secondary winding connected in series with a second rectifier means to form a second output circuit;

said first secondary winding being inductively coupled to said primary winding means by a first magnetic flux which has stored energy such that during said first half-cycle said first output circuit simultaneously conducts current that is a sum of current induced by said primary winding means and magnetizing current induced from said first magnetic flux;

said second secondary winding being inductively coupled to said primary winding means by a second magnetic flux which has stored energy such that during said second half-cycle said second output circuit simultaneously conducts current that is a sum of current induced by said primary winding means and magnetizing current induced from said second magnetic flux;

during said first half-cycle said stored energy in said first magnetic flux decreases while simultaneously said stored energy in said second magnetic flux increases, and during said second half-cycle said stored energy in said first magnetic flux increases while simultaneously said stored energy in said second magnetic flux decreases;

said first magnetic flux and said second magnetic flux have magnetic flux circuits within a three leg E-core having first, second, and third legs;

said primary winding, said first secondary winding, and said second secondary winding are wound on said first leg;

said first magnetic flux existing in a magnetic circuit consisting of said first and second legs; and said second magnetic flux existing in a magnetic circuit consisting of said first and third legs.

6. A full wave DC to DC power converter having magnetically integrated transformer and output filter functions for supplying power to a load, comprising:

an input voltage source for supplying DC input voltage;

a primary winding means;

inverter means adapted to periodically connect said input voltage source alternately across said primary winding means, said connection being of one polarity for a first half-cycle of an inverter period and being of the opposite polarity for a second half-cycle of the period, and such that between said half-cycles there is a dead time where the input voltage is disconnected from said primary winding means;

a first secondary winding connected in series with a first rectifier means to form a first output circuit;

a second secondary winding connected in series with a second rectifier means to form a second output circuit;

said first secondary winding being inductively coupled to said primary winding means by flux in a first transformer means;

said second secondary winding being inductively coupled to said primary winding means by flux in a second transformer means;

an output capacitor means connected in parallel with said load for receiving a first output current from said first output circuit and a second output current from said second output circuit;

said first secondary winding being phased with respect to said primary winding means such that said first rectifier means is forward biased by primary-induced voltage during said first half-cycle and reverse biased by primary-induced voltage during said second half-cycle;

said second secondary winding being phased with respect to said primary winding means such that said second rectifier means is forward biased by primary-induced voltage during said second half-cycle and reverse biased by primary-induced voltage during said first half-cycle;

said flux in said first transformer means increasing in magnitude during said second half-cycle and said flux in said second transformer means increasing in magnitude during said first half-cycle;

said first output circuit simultaneously flowing induced current from said primary winding means and magnetizing current from said flux in said first transformer means during said first half-cycle, and said second output circuit simultaneously flowing induced current from said primary winding means and magnetizing current from said flux in said second transformer means during said second half-cycle;

during said dead time said first output circuit flowing magnetizing current induced by said flux in said first transformer means and, simultaneously, said second output circuit flowing magnetizing current induced by said flux in said second transformer means;

said flux in said first transformer means and said flux in said second transformer means forming first and second magnetic flux circuits, respectively, within a three leg E-core having first, second, and third legs;

said primary winding means, said first secondary winding, and said second secondary winding being wound on said first leg;

said first magnetic flux circuit existing in a magnetic circuit consisting of said first and second legs; and said second magnetic flux circuit existing in a magnetic circuit consisting of said first and third legs.

7. A full wave DC to DC power converter having magnetically integrated transformer and output filter functions for supplying power to a load, comprising:

an input voltage source for supplying DC input voltage;

a primary winding means;

inverter means adapted to periodically connect said input voltage source alternately across said primary winding means, said connection being of one polarity for a first half-cycle of an inverter period and being of the opposite polarity for a second half-cycle of the period, and such that between said half-cycles there is a dead time where the input voltage is disconnected from said primary winding means;

a first secondary winding connected in series with a first rectifier means to form a first output circuit;

a second secondary winding connected in series with a second rectifier means to form a second output circuit;

said first secondary winding being inductively coupled to said primary winding means by flux in a first transformer means;

said second secondary winding being inductively coupled to said primary winding means by flux in a second transformer means;

an output capacitor means connected in parallel with said load for receiving a first output current from said first output circuit and a second output current from said second output circuit;

said first secondary winding being phased with respect to said primary winding means such that said first rectifier means is forward biased by primary-induced voltage during said first half-cycle and reverse biased by primary-induced voltage during said second half-cycle;

said second secondary winding being phased with respect to said primary winding means such that said second rectifier means is forward biased by primary-induced voltage during said second half-cycle and reverse biased by primary-induced voltage during said first half-cycle;

said flux in said first transformer means increasing in magnitude during said second half-cycle and said flux in said second transformer means increasing in magnitude during said first half-cycle;

said first output circuit simultaneously flowing induced current from said primary winding means and magnetizing current from said flux in said first transformer means during said first half-cycle, and said second output circuit simultaneously flowing induced current from said primary winding means and magnetizing current from said flux in said second transformer means during said second half-cycle;

during said dead time said first output circuit flowing magnetizing current induced by said flux in said first transformer means and, simultaneously, said second output circuit flowing magnetizing current induced by said flux in said second transformer means;

said first and second transformer means being implemented on a three leg E-core having first, second, and third legs; and where said first transformer means consists of said first and second legs, and said second transformer means consists of said second and third legs.

8. The converter according to claim 7 wherein: said first transformer means and said second transformer means are separate and independent.

9. A full wave DC to DC power converter having magnetically integrated transformer and output filter functions for supplying power to a load, comprising:

an input voltage source for supplying DC input voltage;

a transformer primary winding means;

inverter means adapted to periodically connect said input voltage source alternately across said primary winding means, said connection being of one polarity for a first half-cycle of an inverter period and being of the opposite polarity for a second half-cycle of the period;

a first transformer secondary winding connected in series with a first rectifier means to form a first output circuit;

a second transformer secondary winding connected in series with a second rectifier means to form a second output circuit;

said first secondary winding being inductively coupled to said primary winding means by flux in a first magnetic circuit means;

said second secondary winding being inductively coupled to said primary winding means by flux in a second magnetic circuit means;

an output capacitor means connected in parallel with said load for receiving a first output current from said first output circuit and a second output current from said second output circuit;

said first secondary winding being phased with respect to said primary winding means such that said first rectifier means is forward biased by primary-induced voltage during said first half-cycle and reverse biased by primary-induced voltage during said second half-cycle;

said second secondary winding being phased with respect to said primary winding means such that said second rectifier means is forward biased by primary-induced voltage during said second half-cycle and reverse biased by primary-induced voltage during said first half-cycle;

said flux in said first magnetic circuit means increasing in magnitude during said second half-cycle and said flux in said second magnetic circuit means increasing in magnitude during said first half-cycle;

said first output circuit simultaneously flowing induced current from said primary winding means and magnetizing current from said flux in said first magnetic circuit means during said first half-cycle, and said second output circuit simultaneously flowing induced current from said primary winding means and magnetizing current from said flux in said second magnetic circuit means during said second half-cycle;

said flux in said first magnetic circuit and said flux in said second magnetic circuit means existing simultaneously;

said flux in said first magnetic circuit means and said flux in said second magnetic circuit means existing within a three leg E-core having first, second, and third legs;

said primary winding means, said first secondary winding, and said second secondary winding being wound on said first leg;

said first magnetic flux circuit means consisting of said first and second legs; and said second magnetic flux circuit means consisting of said first and third legs.

10. A full wave DC to DC power converter having magnetically integrated transformer and output filter functions for supplying power to a load, comprising:

an input voltage source for supplying DC input voltage;

a transformer primary winding means;

inverter means adapted to periodically connect said input voltage source alternately across said primary winding means, said connection being of one polarity for a first half-cycle of an inverter period and being of the opposite polarity for a second half-cycle of the period;

a first transformer secondary winding connected in series with a first rectifier means to form a first output circuit;

a second transformer secondary winding connected in series with a second rectifier means to form a second output circuit;

said first secondary winding being inductively coupled to said primary winding means by flux in a first magnetic circuit means;

said second secondary winding being inductively coupled to said primary winding means by flux in a second magnetic circuit means;

an output capacitor means connected in parallel with said load for receiving a first output current from said first output circuit and a second output current from said second output circuit;

said first secondary winding being phased with respect to said primary winding means such that said first rectifier means is forward biased by primary-induced voltage during said first half-cycle and reverse biased by primary-induced voltage during said second half-cycle;

said second secondary winding being phased with respect to said primary winding means such that said second rectifier means is forward biased by primary-induced voltage during said second half-cycle and reverse biased by primary-induced voltage during said first half-cycle;

said flux in said first magnetic circuit means increasing in magnitude during said second half-cycle and said flux in said second magnetic circuit means increasing in magnitude during said first half-cycle;

said first output circuit simultaneously flowing induced current from said primary winding means and magnetizing current from said flux in said first magnetic circuit means during said first half-cycle, and said second output circuit simultaneously flowing induced current from said primary winding means and magnetizing current from said flux in said second magnetic circuit means during said second half-cycle;

said flux in said first magnetic circuit means and said flux in said second magnetic circuit means existing simultaneously;

said first magnetic circuit means and said second magnetic circuit means existing within a three leg E-core having first, second, and third legs, where said first magnetic circuit means is in said first and second legs, and where said second magnetic circuit means is in said second and third legs.

11. The converter according to claim 10 wherein: said first magnetic circuit means exists in a first transformer and said second magnetic circuit means exists in a second transformer where said first and second transformers are separate.

\* \* \* \* \*